US012667064B2

(12) United States Patent
Cote et al.

(10) Patent No.: US 12,667,064 B2
(45) Date of Patent: Jun. 30, 2026

(54) AUTOMATED IRRIGATION SYSTEM ADJUSTING TO WATERING ERRORS DETERMINED BASED ON LOOK-AHEAD AND LOOK-BEHIND SENSOR DATA TO REDUCE WATER USAGE AND INCREASE AGRICULTURAL CROP YIELD

(71) Applicant: Kristy Cote, Cochrane (CA)

(72) Inventors: Cameron Cote, Calgary (CA); Saad Waraich, Calgary (CA); Ren Xue, North York (CA)

(73) Assignee: Kristy Cote, Cochrane (CA)

( * ) Notice: Subject to any disclaimer, the term of this patent is extended or adjusted under 35 U.S.C. 154(b) by 412 days.

(21) Appl. No.: 18/407,257

(22) Filed: Jan. 8, 2024

(65) Prior Publication Data

US 2024/0245015 A1 Jul. 25, 2024

(30) Foreign Application Priority Data

Jan. 20, 2023 (CA) ................................ CA 3187330

(51) Int. Cl.
 *A01G 25/16* (2006.01)
 *A01G 25/09* (2006.01)
(52) U.S. Cl.
 CPC ........... *A01G 25/167* (2013.01); *A01G 25/09* (2013.01); *A01G 25/165* (2013.01)
(58) Field of Classification Search
 CPC ..... A01G 25/09; A01G 25/165; A01G 25/167
 USPC .......................................... 239/723; 700/284
 See application file for complete search history.

(56) References Cited

U.S. PATENT DOCUMENTS

| | | | |
|---|---|---|---|
| 11,429,071 B2 | 8/2022 | Larue et al. | |
| 11,731,151 B2 | 8/2023 | Cote et al. | |
| 2017/0020087 A1* | 1/2017 | Younis | A01G 25/16 |
| 2022/0167573 A1 | 6/2022 | Cote | |
| 2023/0112376 A1* | 4/2023 | Strnad | G06V 20/188 |
| | | | 47/1.7 |
| 2023/0301228 A1* | 9/2023 | Weimer | A01C 23/007 |

OTHER PUBLICATIONS

Valmont Industries, Inc., webpage, downloaded from https://www.valleyirrigation.com/ on Dec. 4, 2023.

* cited by examiner

*Primary Examiner* — Jason J Boeckmann
(74) *Attorney, Agent, or Firm* — Victor Cardona, Esq; Heslin Rothenberg Farley & Mesiti P.C.

(57) ABSTRACT

An automated irrigation system includes a movable structure that has nozzles for spraying water on aimed area of ground. A controller selects a nozzle and determines a location in an unwatered area to be sprayed after the movable structure has moved forward. A predictive model that takes into account look-ahead sensor data for the location before watering and prior look-behind sensor data from a last time the location was watered is used to generate a watering prescription for the nozzle. After watering, the controller determines an error in detected moisture of the location according to updated look-behind sensor data and updates the predictive model if the error exceeds a threshold. When generating watering prescriptions for multiple nozzles, the controller normalizes their duty cycles by adjusting the speed of the movable structure and further customizes their nozzle control signals to ensure the nozzles do not turn off at same time.

20 Claims, 7 Drawing Sheets

AUTOMATED IRRIGATION SYSTEM ADJUSTING TO WATERING ERRORS DETERMINED BASED ON LOOK-AHEAD AND LOOK-BEHIND SENSOR DATA TO REDUCE WATER USAGE AND INCREASE AGRICULTURAL CROP YIELD

CROSS-REFERENCE TO RELATED APPLICATIONS

This application claims the benefit of priority of Canadian Patent Application No. 3,187,330 filed Jan. 20, 2023, which is incorporated herein by reference.

BACKGROUND OF THE INVENTION

(1) Field of the Invention

The present invention relates generally to reducing water usage and increasing agricultural crop yield. More particularly, the invention relates to an automated irrigation system, controller, and method thereof for generating a watering prescription. The prescription is generated for a location by utilizing a predictive model based on look-head sensor data of the location just prior to watering, along with look-behind sensor data collected last time the location was watered.

(2) Description of the Related Art

The ability to monitor and control the amount of water, chemicals and/or nutrients (applicants) applied to an agricultural field has increased the amount of farmable acres in the world and increases the likelihood of a profitable crop yield. Known irrigation systems typically include a control device with a user interface allowing the operator to monitor and control one or more functions or operations of the irrigation system. By using the user interface, operators can control and monitor numerous aspects of the irrigation system and the growing environment. Further, operators can receive significant environmental and growth data from local and remote sensors.

To improve watering efficiency, prior irrigation systems in general leverage highly detailed field maps in order to generate watering prescriptions. These maps are field-specific and require data from many sources to be gathered and complied before they can be considered accurate. Details included in a field map may include items such as topography (i.e., hills and valleys), soil types, crop types, electrical conductivity (EC), etc. When developed manually by human operators, as they often are, field maps have a high cost due to the manual labor involved.

Attempts have been made to incorporate machine learning methods to improve irrigation systems in the agricultural industry. For example, see one such system described in U.S. Pat. No. 11,429,071 issued on Aug. 30, 2022 and entitled "SYSTEM AND METHOD FOR IRRIGATION MANAGEMENT USING MACHINE LEARNING WORKFLOWS". The system includes a machine learning module which analyzes data collected from one or more sources such as UAVs, satellites, span mounted crop sensors, direct soil sensors and climate sensors. The machine learning module preferably creates sets of field objects from within a given field and uses the received data to create a predictive model for each defined field object based on detected characteristics from each field object within the field.

Improvements to the general state of the art would be desirable. In particular, the prior systems are highly focused on creating and leveraging detailed field/object maps to achieve watering improvements. These systems either require significant human effort to develop a detailed map or use machine learning systems to generate accurate field objects within the field. In both cases, until an accurate map is developed, there are little to no watering improvements available for the generated watering prescriptions. Furthermore, the focus in the prior systems on developing accurate field maps as the primary driver of watering efficiency somewhat neglects the watering operation itself. For instance, even with a highly detailed and accurate field map and associated watering prescriptions, if a wind gust occurs at the time of watering, a location may not be watered properly despite the accurate map and prescription. Conversely, if a particular section of the field is already wet for some reason (e.g., prior heavy rain, flooding, runoff, etc), blindly following the watering prescription predicted from the field map will waste water and potentially harm the crop from over watering.

BRIEF SUMMARY OF THE INVENTION

According to an exemplary embodiment of the invention there is disclosed an automated irrigation system. The system includes a movable structure that is movable at least in a forward direction and has a plurality of nozzles for spraying a plurality of water to irrigate an aimed area of ground adjacent a current position of the movable structure. The system further includes one or more nozzle actuators, where each of the nozzle actuators is coupled to one or more of the nozzles and controls an amount of water per unit time that is sprayed by the one or more of the nozzles to which the nozzle actuator is coupled according to one or more nozzle control signals. The system further includes one or more sensors mounted to the movable structure, where the one or more sensors firstly detect one or more aspects in an unwatered area of ground toward which the movable structure is moving that is in front of the aimed area of ground, and secondly detect the one or more aspects in a watered area of ground that is behind the aimed area of ground. The system further includes a controller coupled to the one or more nozzle actuators and the one or more sensors. The controller includes one or more processors and one or more storage devices, and, by executing a plurality of software instructions loaded from the one or more storage devices, the one or more processors of the controller are configured to select a nozzle and determine a location in the unwatered area of ground that will be sprayed with water by the nozzle after the movable structure has moved in the forward direction. The one or more processors are further configured to determine a target moisture characteristic of the location according to a target moisture data stored in the one or more storage devices and receive a look-ahead set of sensor data for the location from the one or more sensors. The one or more processors are further configured to utilize a predictive model that at least takes into account the look-ahead set of sensor data and a prior look-behind set of sensor data from a last time the location was watered to generate a watering prescription for the nozzle. The one or more processors are further configured to automatically generate the one or more nozzle control signals such that the nozzle sprays water onto the location according to the watering prescription after the movable structure has moved in the forward direction and the unwatered area of ground has become the aimed area of ground. After the movable structure has further moved in the forward direction and the aimed area of ground has become the watered area of ground, the one or more processors are further configured to receive an updated look-behind set of sensor data for the location from the one or more sensors. The one or more processors are further configured to update the predictive model for use a next time the movable structure returns to water the location, the predictive model being updated at least according to the updated look-behind set of sensor data and the target moisture characteristic for the location According to an exemplary embodiment of the invention there is disclosed a controller of an automated irrigation system. The automated irrigation system includes a movable structure that is movable at least in a forward direction and has a plurality of nozzles for spraying a plurality of water to irrigate an aimed area of ground adjacent a current position of the movable structure. The controller includes one or more communication interfaces, one or more storage devices, and one or more processors. The one or more communication interfaces are coupled to one or more nozzle actuators, each of the nozzle actuators being coupled to one or more of the nozzles and controlling an amount of water per unit time that is sprayed by the one or more of the nozzles to which the nozzle actuator is coupled according to one or more nozzle control signals. The one or more communication interfaces are further coupled to one or more sensors mounted to the movable structure, the one or more sensors firstly detecting one or more aspects in an unwatered area of ground toward which the movable structure is moving that is in front of the aimed area of ground, and secondly detecting the one or more aspects in a watered area of ground that is behind the aimed area of ground. By executing a plurality of software instructions loaded from the one or more storage devices, the one or more processors are configured to select a nozzle and determine a location in the unwatered area of ground that will be sprayed with water by the nozzle after the movable structure has moved in the forward direction and determine a target moisture characteristic of the location according to a target moisture data stored in the one or more storage devices. The one or more processors are configured to receive a look-ahead set of sensor data for the location from the one or more sensors and utilize a predictive model that at least takes into account the look-ahead set of sensor data and a prior look-behind set of sensor data from a last time the location was watered to generate a watering prescription for the nozzle. The one or more processors are configured to automatically generate the one or more nozzle control signals such that the nozzle sprays water onto the location according to the watering prescription after the movable structure has moved in the forward direction and the unwatered area of ground has become the aimed area of ground. After the movable structure has further moved in the forward direction and the aimed area of ground has become the watered area of ground, the one or more processors are configured to receive an updated look-behind set of sensor data for the location from the one or more sensors. The one or more processors are further configured to update the predictive model for use a next time the movable structure returns to water the location, the predictive model being updated at least according to the updated look-behind set of sensor data and the target moisture characteristic for the location.

According to another exemplary embodiment of the invention there is disclosed a method of controlling an automated irrigation system. The automated irrigation system includes a movable structure that is movable at least in a forward direction and has a plurality of nozzles for spraying a plurality of water to irrigate an aimed area of ground adjacent a current position of the movable structure.

The method includes communicating by one or more processors with one or more nozzle actuators, each of the nozzle actuators being coupled to one or more of the nozzles and controlling an amount of water per unit time that is sprayed by the one or more of the nozzles to which the nozzle actuator is coupled according to one or more nozzle control signals. The method further includes communicating by the one or more processors with one or more sensors mounted to the movable structure, the one or more sensors firstly detecting one or more aspects in an unwatered area of ground toward which the movable structure is moving that is in front of the aimed area of ground, and secondly detecting the one or more aspects in a watered area of ground that is behind the aimed area of ground. The method further includes selecting by the one or more processors a nozzle and determining a location in the unwatered area of ground that will be sprayed with water by the nozzle after the movable structure has moved in the forward direction and determining by the one or more processors a target moisture characteristic of the location according to a target moisture data stored in the one or more storage devices. The method further includes receiving by the one or more processors a look-ahead set of sensor data for the location from the one or more sensors and utilizing by the one or more processors a predictive model that at least takes into account the look-ahead set of sensor data and a prior look-behind set of sensor data from a last time the location was watered to generate a watering prescription for the nozzle. The method further includes generating by the one or more processors the one or more nozzle control signals such that the nozzle sprays water onto the location according to the watering prescription after the movable structure has moved in the forward direction and the unwatered area of ground has become the aimed area of ground. The method further includes, after the movable structure has further moved in the forward direction and the aimed area of ground has become the watered area of ground, receiving by the one or more processors an updated look-behind set of sensor data for the location from the one or more sensors, and updating by the one or more processors the predictive model for use a next time the movable structure returns to water the location, the predictive model being updated at least according to the updated look-behind set of sensor data and the target moisture characteristic for the location.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
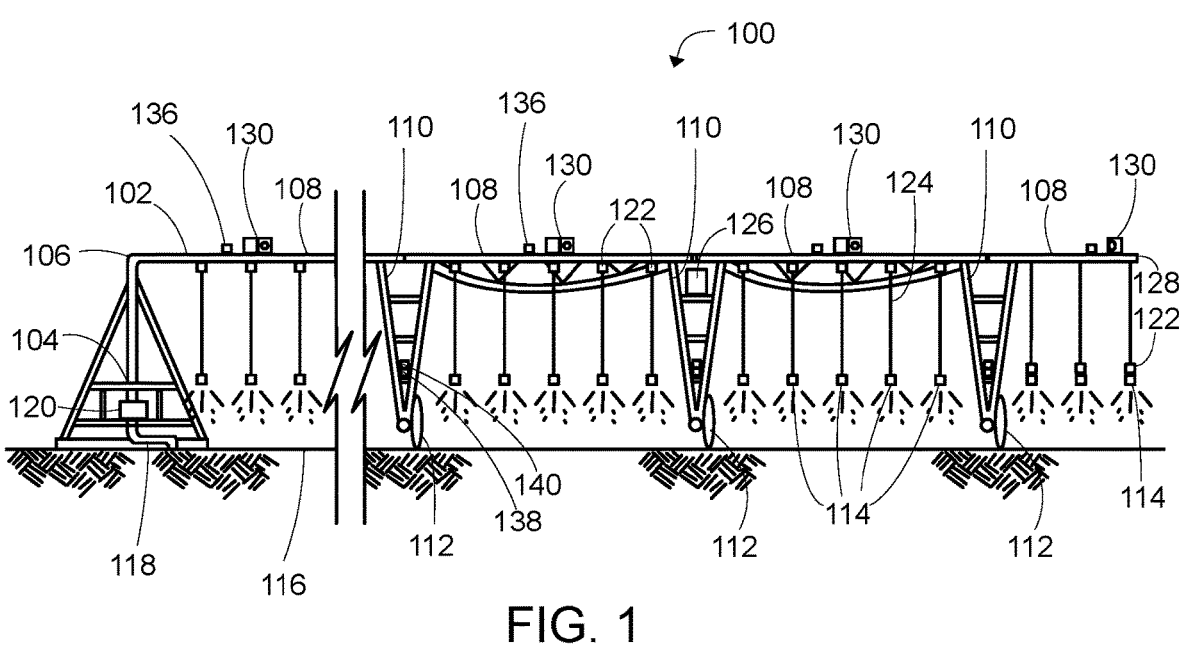
FIG. 1 illustrates a side view of an automated irrigation system according to an exemplary embodiment.
Figure 2:
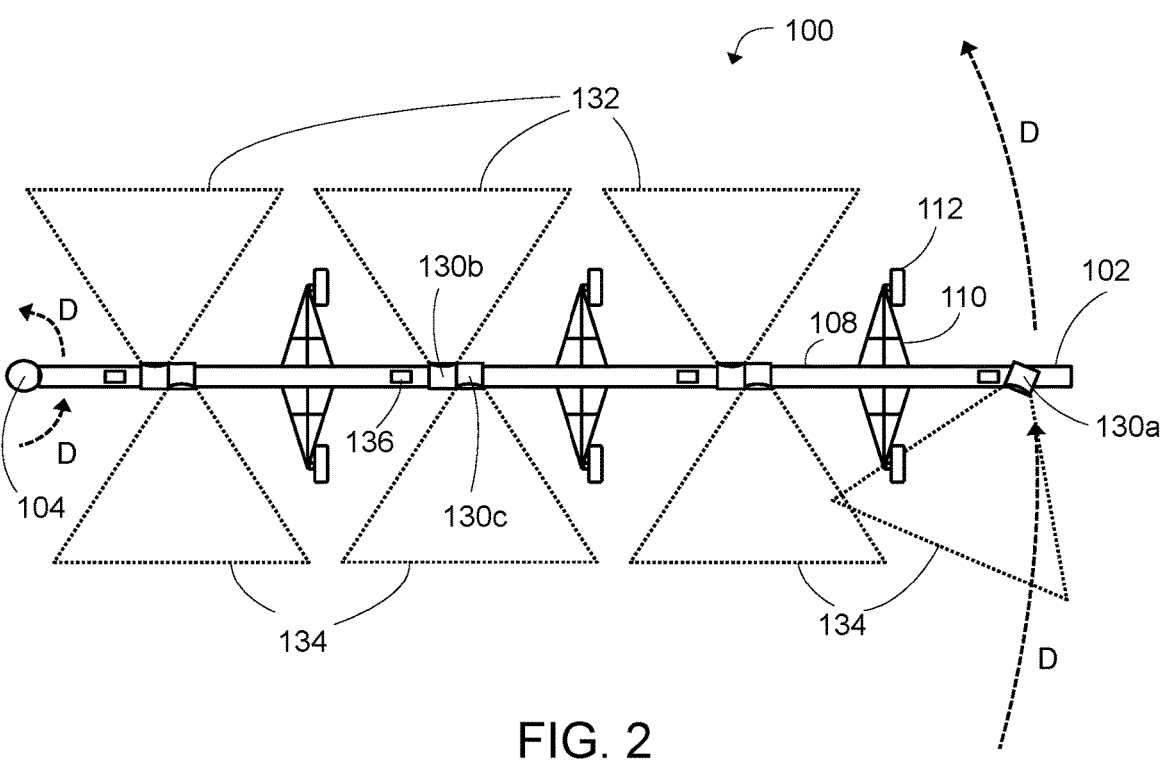
FIG. 2 illustrates a top plan view of the automated irrigation system of FIG. 1.

FIG. 1 illustrates a side view of an automated irrigation system 100 according to an exemplary embodiment and FIG. 2 illustrates a top plan view of thereof. The system 100 includes a pivot structure 102 having a point of rotation 104 at a first end 106 and one or more spans of pipe 108 that sequentially extend from the first end 106. Each of the spans of pipe 108 are supported by a pair of towers 110, where each tower 110 has one or more wheels 112 such that the pivot structure 102 as a whole is rotatable around the point of rotation 104. Each of the one or more spans of pipe 108 have one or more of the nozzles 114 for spraying the plurality of water to irrigate an aimed area of ground 116 that in this embodiment is the ground directly under the nozzles 114. The water is delivered to the nozzles 114 via the one or more spans of pipe 108 from a water source 118 at the first end 106. A pump 120 pushes water with sufficient force from the water source down the spans of pipe 108 so that the water sprays out of all nozzles 114 to cover the aimed area of ground 116. The pivot structure 102 is sometimes referred to in the industry as a "center-pivot sprinker" or simply a "pivot".

The system in this embodiment further includes a plurality of nozzle actuators 122, where each of the nozzle actuators 122 is coupled to one of the nozzles 114 and controls an amount of water per unit time that is sprayed by that nozzle 144 according to a nozzle control signal. The nozzle actuators 122 may be mounted on the spans of pipe 108 and then have tubing 124 to the nozzle 114 suspended therebelow. This is the configuration shown on the left side of FIG. 1. Alternatively, as shown for the last three nozzles 114 on the right side of FIG. 1, the nozzle actuators 122 may also be mounted adjacent the nozzles 114. Mounting the nozzle actuators 122 by the spans of pipe 108 keeps them up and out of the way of high crops. On the other hand, mounting the nozzle actuators 122 adjacent the nozzles 114 facilitates inspection and repair in the event of problems. Either configuration or both may be utilized in different embodiments.

The nozzle control signals for controller the various nozzle actuators 122 are generated by a controller 126, which in this embodiment is mounted on a tower 110 about halfway between the first end 106 at the rotation point 104 and a far end 128 of the pivot structure 102. Mounting the controller 126 in the middle of the pivot structure 102 helps with coupling the controller 126 to the various nozzle actuators 122 and other devices along the pivot structure 102. Distances are reduced between the controller 126 and the endmost devices which helps with both wired and wireless communications.

The controller 126 is further coupled to a plurality of sensors 130 mounted to the pivot structure 102. The sensors 130 in this embodiment firstly detect one or more aspects such as temperature and visual light in an unwatered area of ground 132 toward which the movable structure is moving that is in front of an aimed area of ground. The sensors 130 secondly detect the same one or more aspects (i.e., temperature and visual light) in a watered area of ground that is behind the aimed area of ground after the pivot structure has moved forward.

As shown in FIG. 1, the system 100 in this embodiment has at least one sensor 130 mounted on each span of pipe 108 between the various towers 110 of the pivot structure 102. The sensors 130 may take different forms and there may be multiple sensors 130 located on each span 108.

As shown most clearly in FIG. 2, the pivot structure 102 in this embodiment includes a rotatable sensor 130a that rotates according to a control signal received from the controller 126. The rotatable sensor 130a when rotated into a first position is directed to the unwatered area 132 of ground that is in front of the aimed area of ground 116 and thereby acts as a look-ahead sensor. Likewise, the rotatable sensor 130a when rotated into a second position is directed to the watered area of ground 134 that is behind the aimed area of ground 116 and thereby acts as a look-behind sensor. A benefit of including one or more rotatable sensors 130a is reduction of costs by utilizing a single sensor 130a as both look-ahead and look-behind sensor. Additionally, since the sensor 130a can be rotated, different angles may be selected by the controller, which helps with overlapping captured images and data with other adjacent sensors 130. Although FIGS. 1 and 2 only show one rotatable sensor 130a, this is simply for purposes of illustration; any number of rotatable sensors 130a may be included in other embodiments.

Fixed position sensors 130b and 130c may also be utilized. For instance, FIG. 2 also illustrates fixed-position look-ahead sensors 130b mounted to the movable structure, wherein each of the look-ahead sensors 130b is directed toward the unwatered area of ground 132 that is in front of the aimed area of ground 116. Likewise, fixed position look-behind sensors 130c are mounted to the movable structure 102, wherein each of the look-behind sensors 130c is directed toward the watered area of ground 134 that is behind the aimed area of ground 116. These fixed position sensors 130b,c do not rotate and instead are calibrated during installation to point in the correct angles. Fixed sensors 130b,c have an advantage of simplifying the operation of the system 100 because no rotational control signals are required from the controller 126; however, there may be some additional costs for requiring more sensors 130.

Although FIGS. 1 and 2 illustrates both rotatable 130a and fixed sensors 130b,c being utilized together in a single embodiment, of course, only a single mounting type of sensor 130 (i.e., either rotatably mounted 130a or fixed mounted 130b,c) may also be utilized in other embodiments.

Concerning the types of sensors 130 to be employed and the aspects of the physical environment that they detect, in this embodiment the sensors 130 include thermal imagers and the one or more aspects detected include the apparent surface temperatures as detected by the thermal imagers. Thermal imagers (sometimes referred to as infrared camera) detect and measure the infrared energy of objects seen by the camera. The camera converts that infrared data into an electronic image that shows the apparent surface temperature of the various objects being measured. The heat signatures are converted to data which is sent to the controller 126.

Other types of look-ahead and look-behind sensors 130 may be used as well. For instance, the sensors may include optical cameras and the aspects detected may include visible light and/or near infrared (NIR) as detected by the optical cameras.

The sensors 130 of a particular type in a preferred embodiment are paired such that each type of sensor 130 is available both as a look-ahead sensor and a look-behind sensor covering the same location. For example, if there is a thermal camera acting as a look-ahead sensor for a particular location ahead of the pivot 102, there should also be a thermal camera acting as a look-behind sensor for that same location after the pivot has moved forward in the D direction. As mentioned above, separate sensors 130 may be used for look-ahead and look-behind sensors 130b,c, or a single sensor 130a may be rotated such that it acts as a look-ahead sensor at some times and as a look-behind camera at others.

In some embodiments, for each location in the field, three sets of multispectral images comprising RGB, NIR and thermal are captured at a negative 45 degree angle below horizon using either pivot-mounted robotic sensor(s) 130a and/or fixed sensor(s) 130b,c. The three NIR and RGB images are stitched together. The angle difference between each image is 36 degrees. Images are captured both looking forward (i.e., look-ahead 132) and backward (i.e., look-behind 134). The stitched RGB, NIR and thermal images are compressed into a zip-file together with current GPS coordinates and transmitted wirelessly from the sensor(s) 130 to the pivot controller 126 for further processing using LoRa wireless communication. A LoRa based image transmission protocol is employed for both underground soil sensors and over-pivot robotic sensor 130 communication across up to 400 metres. In some embodiments, a LoRa "router" is created to allow for offline communication for multiple nodes.

Transmitting images reliably through LoRa can be difficult due to limitations in data rate, payload size and signal attenuation. Traditional methods involve sending the image in multiple packets, each requiring an individual acknowledgement, leading to prolonged transmission times and increased network load. To address this issue, in some embodiments a custom protocol hereafter called "Multi-Package LoRa" is used for transmitting large data such as images through LoRa network. The Multi-Package LoRa protocol is designed to reduced image transmission time in point-to-point communication with minimal packet loss. When using multiple LoRa nodes to transmit images, the limitations with standard LoRa MAC protocol may result in high channel usage and a high likelihood of collisions, which can lead to poor performance. To solve this problem, a unique channel priority protocol is utilized for multiple nodes, which in combination with the use of Multi-Package LoRa decreases the maximum time required for successful image transmission.

Of course, other types of wired and wireless communication besides LoRa may also be used in other embodiments.

Other types of sensors may also be mounted to the pivot structure such as position sensors 136, which in this embodiment are mounted one per each span of pipe 108. The position sensors 136 for instance may be global positioning system (GPS) receivers that determine the location of the various pivot spans 108 according to signals detected from satellites. The location information from the position sensors 136 is also sent back to the controller 126, which is coupled either wired or wirelessly thereto.

As mentioned above, the pivot structure 102 is movable and rotates around the point of rotation 104. The movement of the pivot structure 102 is driven by drive wheels 112 coupled to the towers 110. Electric motors 138 are mounted on the towers and drive the wheels 112 either clockwise or counterclockwise in different embodiments to thereby move the pivot in a particular direction D. The direction of rotation D is referred to herein as the forward direction.

In this embodiment, the system includes drive actuators 140 located on each tower 110 that controls an amount of distance per unit time that the pivot structure 102 moves in the forward direction D according to one or more drive control signals, which are generated by the controller 126. In this embodiment, the primary drive actuator 140 is located on the outer most tower 110 and each the other towers 110 include secondary drive actuators 140, which automatically keep the pivot structure 102 substantially in a straight line. As such, the outer tower 110 moves the most per unit time and the other towers 110 each move a reduced distance in the same unit time, where the secondary drive 140 units adjust the control signals and/or utilize position information to keep the pivot structure 102 in a straight line.

In this embodiment, the controller 126 is coupled to the nozzle actuators 122, the position sensors 136, the look-ahead and look-behind sensors 130 and the drive actuators 140. In some embodiments, the coupling is done by copper wires that run along the pipe spans 108 of the pivot structure 102. Wireless connections may also be implemented in some embodiments.

Concerning the control signals generated by the controller 126 and sent to the nozzle actuators 122 and the drive controllers 140, in this embodiment, these signals are binary on/off signals.

For example, when an "on" signal (e.g., low voltage) is sent to a nozzle actuator 122, this indicates that the nozzle actuator 122 should cause the nozzle 114 to which it is coupled to spray water. An "off" signal (e.g., high voltage) indicates the nozzle 114 should stop spraying water. In this embodiment, the nozzle actuators are by default always "on", and the controller 126 dynamically adjusts the amount of water that a nozzle 114 sprays per unit of time by adjusting the duty cycle of the corresponding nozzle control signal.

Likewise, when an "on" signal is sent to a drive actuator 140, this indicates that the drive actuator 140 should turn on the motor 138 to which it is coupled to drive the wheel 112. Alternatively, an "off" signal indicates that the motor 138 should shut off so that the wheel 112 stops turning. The controller 126 in this embodiment dynamically adjusts the speed of the outermost drive wheel 112 and thereby adjusts the speed of the pivot structure 102 moving around the point of rotation 104 by adjusting the duty cycle of the corresponding drive control signal.

Figure 3:
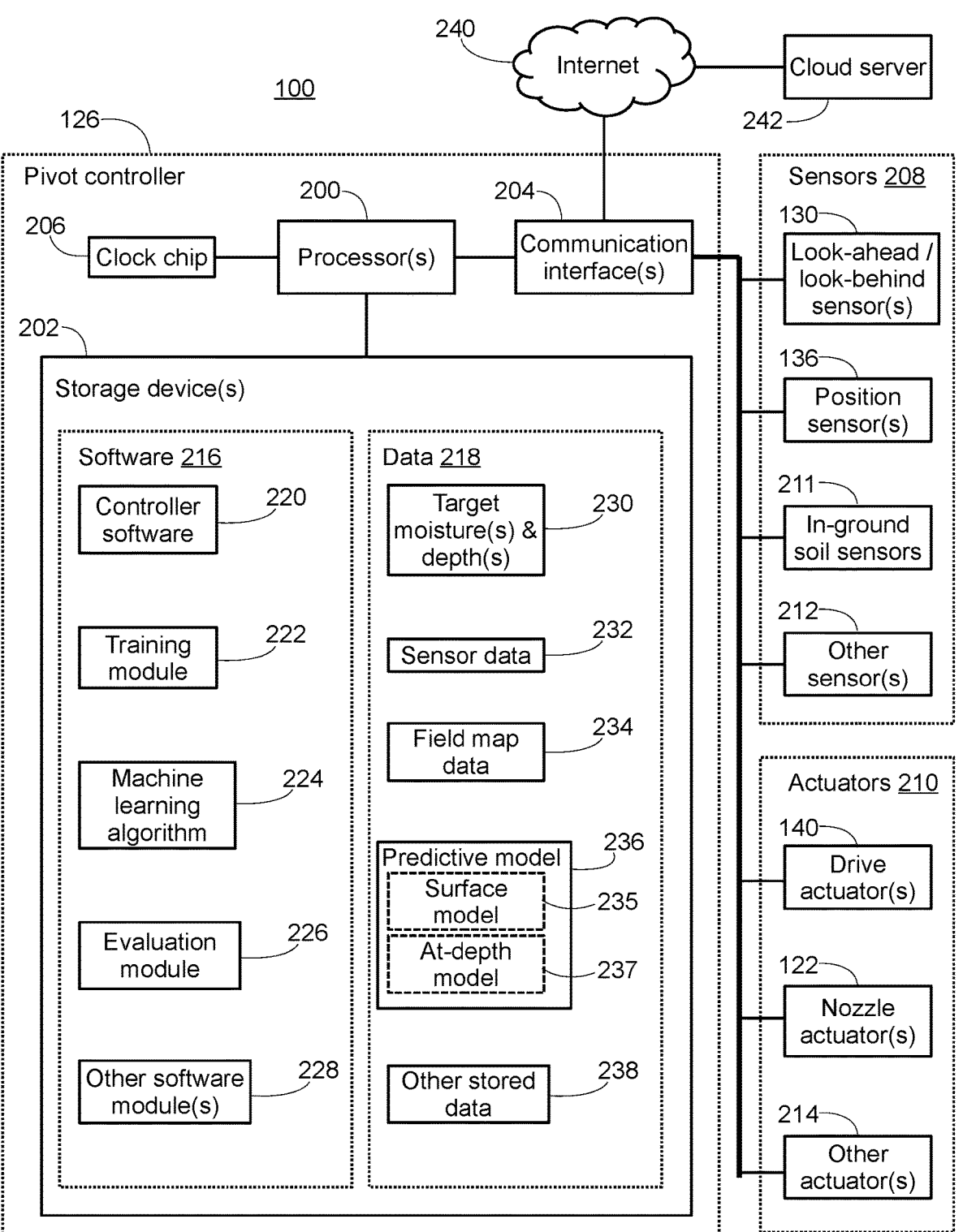
FIG. 3 illustrates a block diagram of the pivot controller and interconnections with external devices in the automated irrigation system of FIGS. 1-2.

FIG. 3 illustrates a block diagram of the pivot controller 126 and interconnections therewith for the system 100 of FIGS. 1 and 2 according to an exemplary embodiment. In this embodiment, the controller 126 is implemented by a computer having one or more processors 200 coupled to one more storage devices 202 and one or more communication interfaces 204. The one or more processors 200 may be included in a central processor unit (CPU) of a computer acting as the controller 126. In the following description the plural form of the word "processors" will be utilized as it is common for a CPU of a computer to have multiple processors 200 (sometimes also referred to as cores); however, it is to be understood that a single processor 200 may also be configured to perform the described functionality in other implementations.

The processors 200 are further coupled to a clock chip 206, which may be an electronic real-time clock chip (RTC) that measures the passage of time and assists the processors 200 to timestamp data, generate various control signals and schedule other events as described further below.

The one or more communications interfaces 204 include transceivers for sending and receiving data to external devices such as sensors 208 and actuators 210. Examples of communication interfaces 204 include Ethernet transceivers, universal serial bus (USB) transceivers, Wi-Fi transceivers, long range (LoRa) transceivers, global system for mobile communications (GSM), as well as any other known types of communication transceivers including wired and wireless proprietary communication buses and protocols. The one or more communication interfaces 204 allow the processors 200 to receive and/or send data to external devices 208, 210. Examples of externally coupled sensors 208 include the look-ahead and look-behind sensors 130, the position sensors 136, in-ground soil moisture sensors 211, and any other sensors 212 that may be utilized in conjunction with the system 100. Examples of other sensors 212 include local weather sensors, wind sensors, other types of in-ground sensors, etc. The one or more communication interfaces 202 in this embodiment are further coupled to external actuators 210 including the pivot wheel drive actuators 140, the nozzle actuators 122, and any other actuators 214 utilized in conjunction with the system 100 such as fertilizer pump actuators, pesticide pump actuators, etc.

The one or more storage devices 202 in this embodiment are implemented by any combination of known memory devices such as FLASH memory, random access memory (RAM), read only memory (ROM), magnetic media such as hard drives, etc. Both software instructions 216 for execution by the processors 200 along with data 218 utilized by the software 216 is stored in the one or more storage devices 202. Examples of software 216 include controller software 220 being high level that runs the overall controller 126 operations. A training module 222 is provided and is used for training a machine learning algorithm 224. Likewise, an evaluation module 226 is provided for testing errors in the output of the machine learning algorithm 224 as described below. Other software modules 228 may also be included as desired.

On the data 218 side, examples include target moisture characteristics 230 such as target soil moisture and depth information. In some embodiments, the entire field may have a single target soil moisture and depth. However, in some embodiments, different locations in the field may have different target moisture characteristics. This may be particularly beneficial when there are different crops planted in different areas of the field being irrigated by the system 100. In some embodiments, the target moisture and depth information 230 is predetermined and inputted by a farmer or other user via a software application running on a computer, mobile phone or other device used by the user.

Sensor data 232 is stored in the storage devices 202 and includes data received from both the look-ahead and look-behind sensors 130, the position sensors 136, the in-ground soil sensors 211, and any other sensors 214 coupled to the pivot controller 126.

Field map data 234 is also stored in the one or more storage devices 202 and includes known or determined information about the field physical traits such as topography (i.e., hills and valleys), soil types, crop types, electrical conductivity (EC), etc. Similar to the related art described in the background section, when available, the controller 126 may utilize this map 234 information, either manually programmed by human users during installation to improve watering performance. However, as will be described further in the below, even if the field map data 234 is empty such as when no information is available after initial installation, the controller 126 in this embodiment can still improve watering efficiency by evaluating watering performance in real time according to data from the look-ahead and look-behind sensors 130 for a given location in the field.

The one or more storage devices 202 further store therein a (hydrological) predictive model 236, which is the output generated by the machine learning algorithm 224. The predictive model 236 is utilized by the processors 200 to generate watering prescriptions for different locations in the field based at least on data detected by the look-ahead and look-behind sensor(s) 130 for that location. After watering, the processors 200 utilize the evaluation module 226 to check the watering results and update the predictive model 236 if required so that next time the results will take into account what happened at that location and overall watering results are improved. In some embodiments, the predictive model 236 is internally divided into two models, a surface model 235 for predicting surface moisture conditions and an at-depth hydrological model 237 for predicting soil moisture at depth. Likewise, in some embodiments, each separate location in the field has its own model 236, which may be generated dynamically in advance of watering that location. As described further below with reference in particular to step 444 of FIG. 4, each time a location is watered, a new predictive model 236 may be dynamically generated by the processors 200 for that location. The updated model 236 may be generated by the processors 200 either right after the location is watered or right before it is watered.

Other data 238 such as season harvest dates, scheduling information, weather forecast information, etc. may also be stored in the one or more storage devices 202 as desired.

As shown in FIG. 3, the pivot controller 126 is further coupled to an external computer network such as the Internet 240 for communication with a cloud server 242. In some embodiments, the pivot controller 126 sends to the cloud server 242 all of the various data 218 stored locally, and the cloud server 242 aggregates and analyzes similar data received from a plurality of pivot controllers 126 at different farms. In some embodiments, the cloud server 242 also sends commands to the pivot controller 126 for configuring and turning on/off the pivot controller 126. See FIG. 10, described later, for more details on the cloud server 242.

Figure 4:
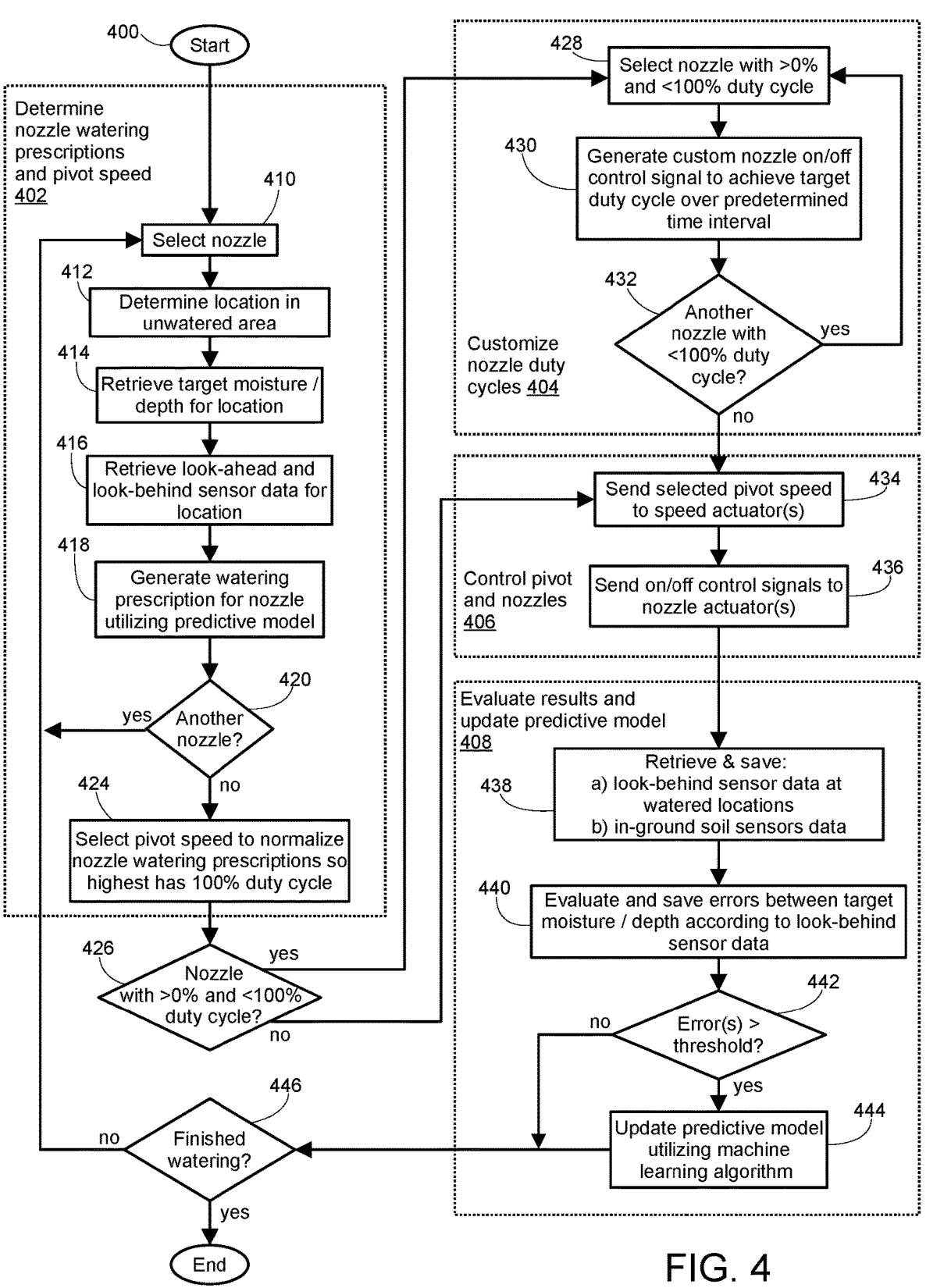
FIG. 4 shows a flowchart of a method of controlling the automated irrigation system of FIGS. 1-3 according to an exemplary embodiment.

FIG. 4 shows a flowchart of a method of controlling the automated irrigation system 100 of FIGS. 1-3 according to an exemplary embodiment. The steps of FIG. 4 may be performed by the one or more processors 200 of the controller 126 executing the various software 216 loaded from the one or more storage devices 202. The steps of the flowchart are not restricted to the exact order shown, and, in other configurations, shown steps may be omitted or other intermediate steps added.

The process begins at step 400, which may correspond to the pivot controller 126 powering up and activating a watering process for a particular field. Alternatively, the starting step 400 may correspond to a farmer or other user activating a particular mode on the pivot controller 126, which may be done by one or more physical buttons (not shown) or may be done by a mobile or other electronic device of the farmer communicating with the pivot controller 126 either directly or via the cloud server 242.

After starting, the processors 200 of the controller 126 determine nozzle 144 watering prescriptions and pivot speed for the wheels 114 at step 402, customize any duty cycles that are between 0% and 100% for nozzle control signals at step 404, turn on the nozzles 114 with the customized duty cycles and control the pivot structure 102 movement at step 406, and then evaluate and update the predictive model 236 at step 408. These high level steps 402, 404, 406, 408 divided into a plurality of smaller steps as follows:

At step 410, the processors 200 firstly select one of the plurality of nozzles 114. For instance, the nozzles 144 may be selected one by one in sequential or other order and this step involves the processors 200 selecting a first or next of the nozzles 114 depending on the desired order.

At step 412, the processors 200 select a location in the unwatered area of ground 132 toward which the nozzle 114 selected at step 410 will spray water once the pivot structures 102 moves forward (i.e., in the D direction shown in FIG. 2). The location selected at step 412 will be in front of the currently aimed area 116 where the nozzle 114 is currently spraying water based on the current position of the pivot structure 102.

At step 414, the processors 200 determine a target moisture characteristic of the location according to a target moisture data 230 stored in the one or more storage devices 202. In some embodiments, the target moisture characteristic includes a moisture level and desired depth as specified by a farmer or other user according to the type of crop that is planted at that location in the field. The target moisture levels and depths be saved as a schedule with different values that change over time to account for different needs of the crop during different portions of the growth cycle. This target moisture characteristic information 230 may be predetermined and saved in the storage device 202 and at step 414 the processors retrieve the appropriate target moisture characteristics based on the location and the current time and date.

At step 416, the processors 200 retrieve a look-ahead set of sensor data for the location and, if available, the processors 200 further retrieve a look-behind set of sensor data for the location. The look-ahead set of sensor data is retrieved from the look-ahead sensors 130. The look-ahead set of sensor data is transmitted from the applicable sensors 130 at the time step 416 is executed, i.e., in real-time, and represents up-to-date sensor information of the current conditions of the location in the unwatered area 132. For instance, assuming the look-ahead sensors 130 include a thermal imager, the look-ahead sensor data will include apparent surface temperatures of the various objects and surfaces at the location. Likewise, assuming the look-ahead sensors 130 include an optical camera, the look-ahead sensor data will include information of visual light of the various objects and surfaces at the location. As described before, the look-ahead sensors 130 may be fixedly mounted (e.g., sensors 130*b,c*) to the pivot structure 102 such that they already point to the location; alternatively, step 416 may involve the processors 200 sending one of more control signals to a rotatable sensor 130*a* to rotate the sensor 130*a* to point toward the location. Additionally, the processors 200 at step 416 may save a timestamped version of the look-ahead sensor data along with other parameters and location coordinates in the sensor data 232 stored in the one or more storage devices 202.

Concerning the look-behind set of sensor data for the location, this data will not be available the very first time the pivot structure 102 waters the location. However, as described further below (see step 438), once the location has been watered, the pivot structure 102 will move past the location and the location will become a watered area 134 as seen by the look-behind sensors 130. At step 416, the processors 200 check the one or more storage devices 202 in order to see if prior-saved look-behind sensor data exists for the location. When yes, it is also retrieved at step 416. Just like for the look-ahead sensor data, if the sensors 130 include thermal imagers, the look-behind set of sensor data will include the prior apparent surface temperatures of the various objects and surfaces at the location after it was last watered, and, if the look-ahead sensors 130 include an optical camera, the look-ahead sensor data will include prior information of visual light of the various objects and surfaces at the location after it was last watered.

At step 418, the processors 200 utilize the predictive model 236 to generate a watering prescription for the nozzle 114. The predictive model 236 at least takes into account the look-ahead set of sensor data, and, if available, further takes into account previous look-behind sensor data showing how the watering operation went last time the same location was watered. In some embodiments, the predictive model 236 is a neural network and the look-ahead and look-behind sets of sensor data are input data fed to the neural network. In addition to the look-ahead sensor data and, if available, the look-behind sensor data, the predictive model 236 may also take into account any other sensor data 232 such as position data, weather data, wind data, in-ground moisture data gathered from the in-ground soil sensors 211, etc. In some embodiments, the in-ground soil sensors 211 are utilized for ground truth moisture data and are used to build the hydrological model 236. Field map data 234 may also be inputted into the predictive model 236 similar to as described in the background section so that the predictive model 236 can provide an optimized watering prescription for the selected nozzle 114. Again, assuming the predictive model 236 is a neural network, any desired and available data may be fed into the network as additional input data. For later evaluation and retraining, the processors 200 at step 418 may save a timestamped version of all input data along with other parameters and location coordinates in the sensor data 212 in the one or more storage devices 202.

The output of the predictive model 236 at step 418 is a watering prescription for the nozzle 114. In some embodiments, the watering prescription is specified as an amount of water per unit time.

At step 420, the processors 200 determine whether there is another nozzle 114 on the pivot structure 102 that needs a watering prescription. If yes, control returns to step 410 to select the next nozzle 114 and repeat the above process to generate a watering prescription for the next nozzle 114. Alternatively, once all nozzles 114 have watering prescriptions generated, control proceeds to step 424.

At step 424, the processors 200 select the pivot speed to thereby normalize the various nozzle watering prescriptions. As described above, the watering prescriptions may be expressed as amounts of water per unit time. Each of the nozzles 114 in this embodiment has a predetermined flow rate and can be turned on and off under by a nozzle actuator 122 according to control signals from the controller 126. To meet a watering prescription for a particular nozzle 114, the controller 126 needs to ensure that the nozzle 114 is turned on for the right amount of time. To achieve this in some embodiments, the controller 126 determines an appropriate duty cycle for each nozzle 112. At step 424, the processors 200 normalize the duty cycles for all the nozzles 114 such that the nozzle(s) 114 with the highest watering prescription has a duty cycle of 100%. In view of the nozzle flow rates, the processors 200 do this by adjusting the speed of rotation of the pivot structure 102 such that the nozzle(s) 114 with the highest watering prescription can just stay turned on continuously before the pivot structure 102 moves in the forward direction D and the nozzles 114 move on to watering a next location.

The speed of rotation of the pivot structure 102 corresponds to an amount of distance per unit time that the drive wheels 112 move, in particular, the outer most drive wheel 112 which moves the fastest. Assuming the outer most drive wheel motor 138 operates at a set (i.e., constant) speed when turned on, the processors 200 can control the overall speed of the pivot structure 102 by turning on and off this motor 138 with an appropriate duty cycle. Again, this is done by the processors 200 generating a control signal for transmission to the drive actuator 140 controlling the drive wheel 112.

At step 424, the processors determine the appropriate drive and nozzle control signals to both maximize the speed of rotation of pivot 102 over time and also ensure that the nozzles 114 with the highest watering prescriptions are always turned on. The other nozzle duty cycles are scaled as appropriate in view of the pivot structure 102 speed of rotation such that all nozzles 114 meet their individual watering prescriptions as generated at the various iterations of step 418.

Each time step 424 is reached, which may occur each time the pivot structure 102 moves to a next location and the overall process of FIG. 4 is repeated, the speed of rotation and various nozzle duty cycles may be changed by the processors 200 as described above. By selecting the pivot speed to normalize the nozzle 114 watering duty cycles at each iteration (i.e., at each time step 424 is reached), there are at least two benefits. A first benefit is that, by the processors 200 continuously selecting the highest possible pivot rotation speed in view of the current watering prescriptions, the entire field is watered in the least amount of time. Maximizing pivot speed means that each location in the field will be more frequently watered as the pivot structure 102 will generally rotate faster. This helps avoid stresses on the crop from infrequent watering. Furthermore, ensuring that the nozzles 114 that currently have the highest watering prescriptions have a 100% duty cycle helps reduce stresses on the water pump 120 because there are always one or more active nozzles 114 spraying water thereby relieving pressure in the pipe spans 108.

Each time step 424 is completed, the processors 200 will firstly have a set of nozzle duty cycles ranging from 100% for the nozzles 114 with highest watering prescriptions down to 0% for other nozzles 114 that do not require to be turned on. The processors 200 will secondly have a drive control duty cycle for driving the wheels 112 to rotate the pivot structure 102 to the next location and keep it there for the proper amount of time before moving forward to a next location.

At step 426, the processors 200 determine whether any of the nozzle duty cycles in the set determined at step 424 have a non-zero duty cycle of less than 100%. If all nozzles 114 have duty cycles either fully off (0%) and/or fully on (100%), then step 426 will proceed along the "no" branch to step 434 to turn on/off the nozzles 114 and control the pivot speed directly. However, if there are different non-zero watering prescriptions for different nozzles 114, then the one or more nozzles 114 tied for the highest watering prescriptions will be normalized to 100% duty cycle and the other nozzles 114 will have appropriately scaled non-zero duty cycles less than 100%. When there are nozzles with duty cycles between 0% and 100%, control proceeds to step 428.

At step 428, the processors select a nozzle with a duty cycle between 0% and 100%. For instance, the nozzles 114 fitting this criteria may be selected one by one in sequential or other order and this steps 428 involves the processors 200 selecting a first or next of the nozzles 114 fitting this criteria depending on the desired order.

At step 430, the processors 200 generate a custom nozzle control signal for the nozzle 114 selected at step 428. The nozzle control signal in this embodiment is an on/off binary signal that has an average duty cycle of the duty cycle of the nozzle 114 over a given unit time, but is customized such that two nozzles 114 have a same duty cycle will have different customized control signals. In other words, step 430 involves generating a nozzle-specific control signal that achieves the target duty cycle in a unique way from the way the duty cycles are achieved for other nozzles 114. In some embodiments, the customization utilizes randomness so that the control signals for the various nozzles 114 with duty cycles between 0% and 100% are different from each other, even if the nozzles have the same target duty cycle determined at step 424.

At step 432, the processors 200 determine whether there is another nozzle 114 that has a target duty cycle above 0% and below 100% that has not yet been customized. When yes, control proceeds to step 428 to select the nozzle; otherwise, control proceeds to step 434.

A benefit of customizing the various nozzle duty cycles that are not fully on or off at step 404 is to help relieve stresses on the water pump 120. When many nozzles 114 turn off at the same time, back pressure on the water pump 120 can be significant. This effect may be referred to as "water hammer" and can damage the pump 120 and spans of pipe 108. Customizing the various nozzle duty cycles at step 404 helps prevent all the nozzles 114 from turning off at the same exact time and thereby optimizes efficiency along the pump 120 performance curve. Pump 120 losses are minimized by the prescription customization/randomization algorithm, which improves water pressure uniformity across the pivot. Utilizing a random function to perform the customization is easy to do computationally—even though there may still be some nozzles 114 that coincidentally turn off at the same time, randomization of individual nozzle 114 duty cycles still greatly reduces the water hammer effect. Another benefit is a reduction in energy usage due to increased watering efficiency and optimal pump 120 output.

At step 434, the processors 200 send the pivot drive control signal generated at step 424 to the drive actuator(s) 140 for the drive wheel(s) 112. This moves the pivot structure 102 forward by the appropriate distance for the appropriate amount of time. Likewise, at step 436, the processors 200 send the various nozzle control signals to the nozzle actuators 122 thereby causing the various nozzles 114 to spray water at the new aimed locations 116 thereunder according to the duty cycles determined at step 424 and possibly customized at step 404.

At step 438, the processors 200 retrieve and save the look-behind sensor data at the now watered locations 134 behind the pivot structure 102 along with in-ground soil sensor data. The look-behind set of sensor data is retrieved from the look-behind sensors 130 and the in-ground soil sensor data is retrieved from the in-ground soil sensors 211. Both these sets of data are preferably transmitted from the applicable sensors 130, 211 at the time step 438 is executed, i.e., in real-time, and represents up-to-date sensor 130, 211 information of the current conditions of the now watered locations just after being sprayed according the various nozzle watering prescriptions. For instance, assuming the look-behind sensors 130 include a thermal imager, the look-behind sensor data will include apparent surface temperatures of the various objects and surfaces at the now watered locations sprayed by the various nozzles. Likewise, assuming the look-behind sensors 130 include an optical camera, the look-behind sensor data will include information of visual light of the various objects and surfaces at the now watered locations. As described before, the look-behind sensors 130*b,c* may be fixedly mounted to the pivot structure such that they already point to the watered area 134 behind the pivot structure 102; alternatively, step 438 may involve the processors sending one of more control signals to rotatable sensors 130*a* to rotate the sensors 130*a* to point toward the locations in the watered area 134.

Once the look-behind of sensor data is retrieved, the processors 200 save the look-behind sensor data in the sensor data 232 in the one or more storage devices 202. This data 232 is stored with location coordinates and is time stamped. Each time rotating around the field, the processors 200 at step 416 will for each location in the field retrieve the look-behind set of sensor data for that location at step 416 to help the watering prescription generated at step 418 later take into account what happened the last time that location was watered.

In this embodiment, the system 100 includes soil moisture sensors 211 that are placed in the field to gather ground truth data and further allow the processors 200 of the controller 126 to update the ground moisture predictive model 236 periodically.

At step 440, the processors 200 evaluate errors between the target moisture characteristics for the various now-watered locations and the now-detected moister characteristics for the same locations determined according the look-behind set of sensor data.

Taking the example where the sensors 130 include thermal imagers, the errors calculated at this step may be determined according to thermal temperature differences. When watering is successful, the temperature of the ground and plants will drop. The amount of temperature drop will depend on a number of factors such as the ambient air temperatures, humidity, unwatered ground and crop temperatures, the water temperature, the amount of water already present on the ground and crop prior to watering, wind gusts, etc.

For a specific example, assume watering is occurring on a hot and sunny day where the ambient temperature is 40° C. Based on the watering prescription for a location as generated by the predictive model 236 taking into account these factors, the processors 200 may expect to see a temperature drop of 20° C. immediately after watering a particular location. If the look-behind set of sensor data instead shows a temperature drop of only 10° C., this would mean an error of 10° C. The error may be expressed as either a temperature difference error or may be converted by the processors 200 into other units such as an amount of water that is missing, or simply as under watered condition, for example.

To give another example where the sensors 130 include optical cameras, assume watering is occurring on a dry day where the unwatered soil has a light brown color value (e.g., a first red green blue (RGB) value) and the edges of unwatered crop leaves have a dark green color value (e.g., a second RGB value). Based on the watering prescription for a location as generated by the predictive model 236 taking into account these factors, immediately after watering a particular location the processors 200 may expect to see a color change of the soil to a darker brown RGB value as a result of the soil becoming wet and a color change of the edges of the crop leaves to a lighter green RGB color value from as a result of a glistening effect of the wet leaves. If the look-behind set of sensor data instead shows other RGB values different than expected, this would mean an error. Again, the error may be expressed as either an RGB color difference or may be converted by the processors into other units such as am amount of water that is missing, or an over water/under water condition, for example.

The errors determined according to the look-behind set of sensor data at step 440 are also in this embodiment stored along with the look-behind sensor data in the sensor data 232 of the one or more storage devices 202. The saved error information may be retrieved by the processors 200 at step 416 and utilized at step 418 to generated the watering prescriptions based on the look-behind sensor data. Saving information about the error avoids the processors 200 needing to re-calculate the error on the look-behind sensor data at step 418.

At step 442, the processors 200 evaluate whether the errors determined at step 440 exceed one or more thresholds. The thresholds may be discrete values such a maximum allowable temperature difference between target and measured, or a maximum RGB color value differences between target and measured.

The thresholds may also be temporal or multiple in nature such as having a threshold of a number of times in a predetermined time period (e.g., X times in Y hours) or a number of times in a row (e.g., X times in a row) that an error has occurred for a particular location in the field. For instance, a single instance (e.g., one time) of insufficient temperature drop as measured by a thermal imager acting as the look-behind sensor 130 may indicate a wind gust prevented some of the water from reaching the aimed area of ground 116. The watering prescription as generated by the predictive model 236 may be fine but it was just an unusually large gust of wind that prevented much of the water from reaching the crop and ground. In this case, step 442 may determine that the threshold of X times in a row (e.g., five times in a row) was not met and control simply proceeds to step 446 without updating the predictive model 236. In this case, the next time the location is watered, the predictive model 236 at step 418 will take into account the look-behind sensor data and note the prior error in watering the last time the location was watered. Assuming the outside weather and conditions stay substantially the same, the predictive model 236 will add additional water to the watering prescription to compensate for the one-off wind gust that occurred last time around. On the other hand, if there is an insufficient temperature drop of crop and/or ground more than X times in a row (i.e., more than five consecutive rotations of the pivot), this likely indicates that the predictive model 236 is producing an insufficient watering prescription and the model 236 itself should be updated. It is highly unlikely that a random wind gusts would produce this result, and even if they do, it is likely better to change the model 236 to start accounting for persistent high winds at this location.

In addition to detecting errors such as insufficient temperature drops (i.e., insufficient watering), excessive temperature drops (i.e., over watering) may also be detected. As such, the thresholds at step 442 may be expressed as ranges of acceptable temperature or color differences. Other types of values and ranges may also be used as desired. Finally, these thresholds may also be changed by the processors 200 over time such as to account for time of day differences, seasonal differences, crop changes, local weather and weather forecasts, etc.

When one or more of the errors determined at step 442 exceed their applicable thresholds, control proceeds to step 444 to update the predictive model 236. Otherwise, when there are no errors or none of the errors determined at step 440 exceed their applicable thresholds, control proceeds to step 446.

At step 444, the processors 200 update the predictive model 236 such that the predictive model 236 will, assuming all field and other conditions are substantially the same in the future, generate an updated (i.e., different) watering prescription in view of the look-ahead set of sensor data and other input parameters along with associated error value(s) for the location a next time the pivot structure 102 returns to the location for subsequent watering.

When the predictive model 236 is implemented as a neural network, step 444 may be done by the processors 200 executing the training module 222 in association with the machine learning algorithm 224 to generate an updated predictive model 236. If the errors at step 442 indicate that a particular location was not watered enough, the predictive model 236 is updated (i.e., the neural network may be retrained) such that the model 236 will generate a higher watering prescription based on the original look-ahead set of sensor data saved for the location at step 416 and other original input data saved for the location at step 418. In this way, if those same input parameters are utilized in the future, the predictive model 236 will generate a different watering prescription for the nozzles 114 that will water that location than it did before the update performed at step 444.

At step 446, the processors 200 determine whether the watering operation is finished. When watering is deemed to be finished, the process ends; otherwise, control returns to step 402.

In some embodiments, step 446 will always proceed along the "no" branch back to restart the above-described process until the crop is harvested a farmer or other user inputs a stop command to the pivot controller 126. In other embodiments, breaks may occur and the process of FIG. 4 may be deemed finished by the processors 200 at step 446 for any number of desired reasons and then automatically restarted later. For instance, after the pivot structure 102 has completed a full rotation around the field, the processors 200 may deem the watering to be finished at step 446 and then restart the process at step 400 after a predetermined time period. In another example, during heavy rains detected by soil or other weather sensors, the processors 200 may deem the watering to be finished at step 446 and then restart the process at step 400 after determining the rain has stopped.

Although FIG. 4 and the above description has focused on checking the error(s) evaluated at step 440 to see if a threshold is exceeded at step 442, in some embodiments, step 442 is omitted and the processors 200 simply proceed from step 440 to step 444 to thereby update the predictive model 236 each time a location is watered. For example, each time a location is watered (e.g., either right after watering, or right before watering), an updated model 236 for that location may be generated by the processors 200. Utilizing a threshold at step 442 is useful in some embodiments to save computational cycles when the updated model 236 will be very similar or perhaps the same as a prior-used model 236; however, in some implementations the model update process at step 444 may be quick to perform and thus performed automatically by the processors 200 each time a location is watered regardless of whether the model 236 will be changed in comparison to what it used to be.

In an exemplary embodiment, a machine learning based hydrological model and a data pipeline architecture operate as follows: Data received from the in-ground soil moisture sensors 211 (at multiple depths) and every two degrees of pivot 102 movement from robotic (i.e., rotatable) sensor 130a or fixed sensors 130b,c mounted on each span 108 of the pivot structure 102 is extracted and transformed by the processors 200 of the pivot controller 126 into usable and trusted resources. The processed data is loaded into a parametric regression based machine learning algorithm 224 which gives outputs that will be saved in the local database for analysis processes. Local weather data (temperature, humidity, wind speed, precipitation), along with in-ground soil moisture sensor data from different depths is fed into a (hydrological) predictive model 126 which then generates watering prescriptions or runtimes for each nozzle on the pivot. The runtimes are transmitted over LoRa to each nozzle actuator 122 which then allows for precise control of each nozzle 114 according to crop water needs.

Figure 5:
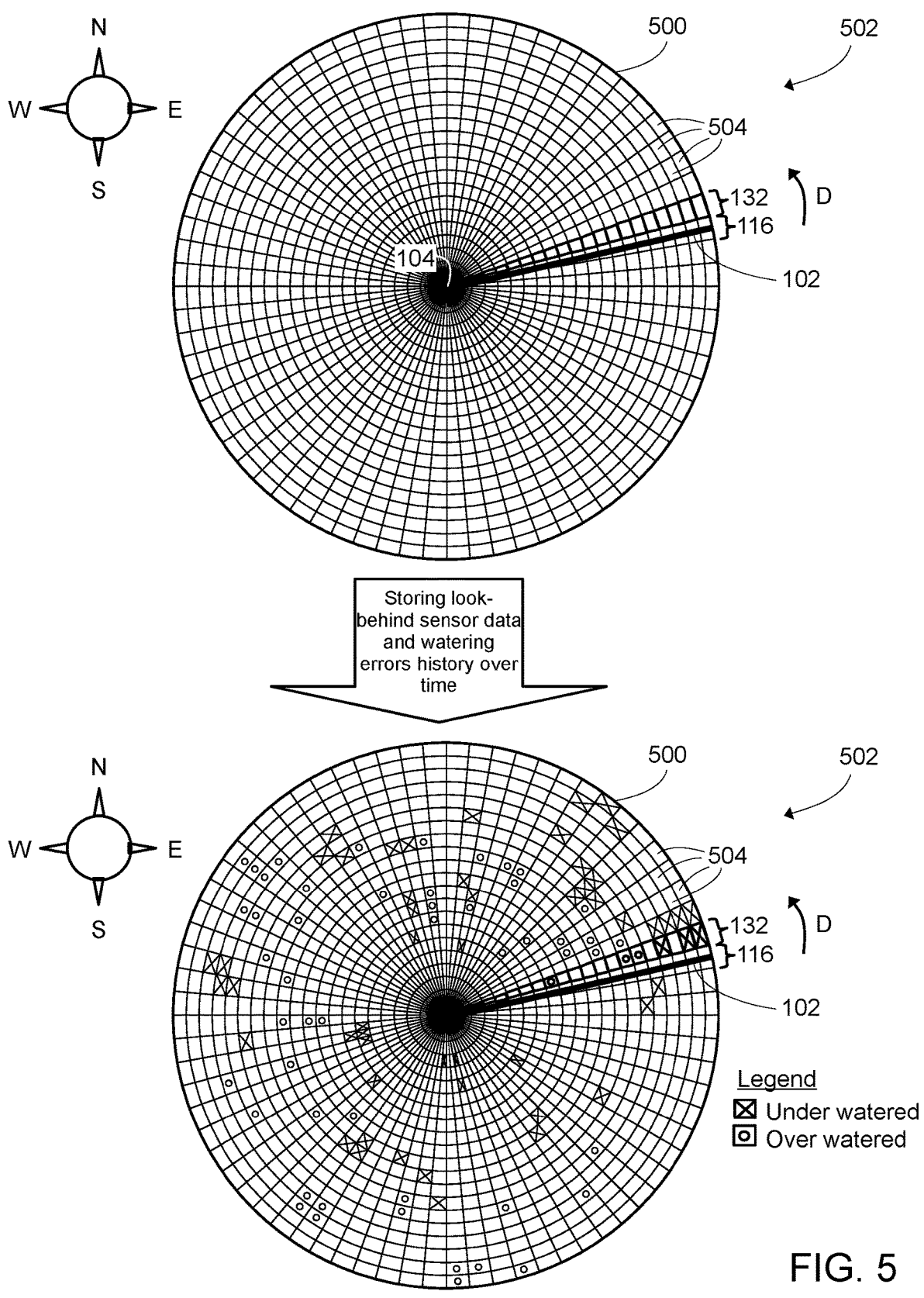
FIG. 5 illustrates how watering errors at different locations in a field as determined according to a look-behind set of sensor data at step 440 of FIG. 4 may be stored in one or more storage devices of the controller according to an exemplary embodiment.

FIG. 5 illustrates how the watering errors at different locations in the field 500 as determined according to the look-behind set of sensor data at step 440 of FIG. 4 may be stored in one or more storage devices 102 of the controller 126 according to an exemplary embodiment.

The top portion 502 of FIG. 5 illustrates a top plan view of the circular field 500 being watered and the pivot structure 102 radially extending for the point of rotation 104 at the center. The pivot structure 102 rotates in the forward direction D being a counter-clockwise direction in this example. The field 500 is broken into a number of mico-zones 504 which correspond to different locations in the field. For purposes of illustration, FIG. 5 is simplified by having a reduced number of zones 504; a more appropriate implementation for a typical field where the pivot structure is approximately 800 m long would divide the field into approximately 10 k to 30 k zones, where each is treated as a separate location that can be selected at step 412 by the processors 200 for watering prescription generation. The number of zones 504 may be adjusted for different field 500 sizes and applications and need not be within the 10 k-30 k range in other embodiments.

The top portion 502 of FIG. 5 illustrates the situation upon first starting to water the field 500. The top portion 502 shows that that are no watering errors stored for any of different zones 504 of the field before watering has occurred. For this reason, the processors 200 at step 416 of FIG. 4 only retrieves the look-ahead set of sensor data which corresponds the unwatered area 132 being the zones 504 directly in front of the aimed area of ground 116 currently below the pivot structure 102. The processors 200 then proceed with the rest the process of FIG. 4 to generate watering prescriptions and normalize those prescriptions by selecting the pivot drive speed, i.e., rotation speed (step 402), customize the nozzle duty cycles between 0% and 100% (step 404), control the pivot wheel 112 and nozzles 114 (step 406) to actually conduct the watering (step 406), and then evaluate the results and save error information and update the predictive model 236 if required (step 408).

The bottom portion 510 of FIG. 5 illustrates the situation after the pivot structure 102 has rotated clockwise once around the field and has watered all locations (i.e., zones 504) according to their respectively generated watering prescriptions. As illustrated, error information such as whether a zone 504 has been under watered or over watered is stored in the one or more storage devices 202. This is done for each location where a watering error was detected by the processors 200 at step 408. The error information is represented in FIG. 5 by "X" for under watering and "o" for over watering. In this way, a next time the pivot structure 102 retrieves the look-ahead set of sensor information for the unwatered area 132 being the zones 504 directly in front of the aimed area of ground 116, the processors 200 also retrieve the error information for these zones 504 in the unwatered area 132 from the sensor data 232 stored in the one or more storage devices 202. The processors 200 then generate the watering prescription for the various nozzles 114 at step 418 taking into account both the look-ahead set of sensor information and the look-behind set of sensor information. In this way, even if the predictive model 236 used to generate the watering prescriptions is the same as the last time these locations (i.e., zones 504 in the unwatered area 132) were watered, the predictive model 236 can still adjust and compensate the various watering prescriptions according to prior under and over watering errors.

Figure 6:
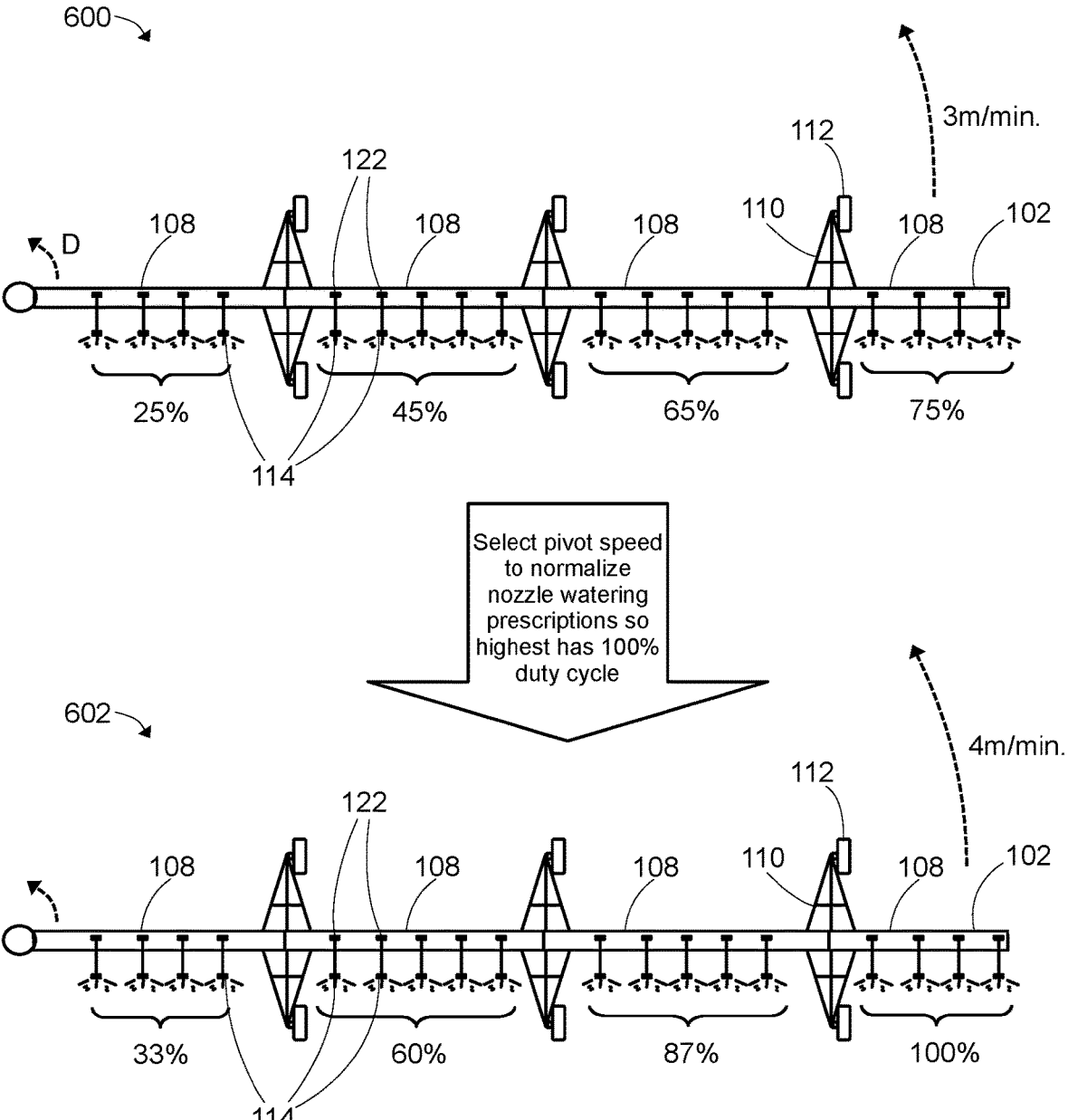
FIG. 6 illustrates an example of how nozzle duty cycles may be normalized at step 424 of FIG. 4 by selecting an appropriate drive speed for the pivot structure according to an exemplary embodiment.

FIG. 6 illustrates an example of how nozzle duty cycles may be normalized at step 424 of FIG. 4 by selecting an appropriate drive speed for the pivot structure 102 according to an exemplary embodiment. The top portion 600 of FIG. 6 illustrates a plan view of the pivot structure 102 with non-normalized nozzle duty cycles of 25%, 45%, 56%, 75% at a first pivot drive speed of 3 m/min. The top portion 600 of FIG. 6 illustrates the situation that may be present just prior to the processors 200 beginning step 424 of FIG. 4—each nozzle 114 has a water prescription, which are converted to a duty cycle value given the nozzle 114 flow rates and the current speed of pivot structure 102. For illustration purposes, in this example the nozzles 114 on each span 108 of the pivot structure 102 have the same duty cycle; however, it is to be understood that in some embodiments each nozzle 114 may have its own duty cycle and nozzles 114 on a same span 108 may have different duty cycles.

The bottom portion 602 of FIG. 6 illustrates a top plan view of the pivot structure 102 with normalized nozzle duty cycles at a newly selected drive speed of 4 m/min. The bottom portion 602 of FIG. 6 illustrates the situation after the processors 200 have selected the appropriated pivot drive speed to thereby normalize the nozzle duty cycles at step 424. As shown, the nozzles 114 that have the highest watering prescription (originally 75%) are normalized such that their duty cycles are scaled up to 100%. This means that more water will be sprayed onto a particular location of the aimed ground 116 per unit time by these nozzles 114 and thus the processors 200 have also increased the pivot speed from 3 m/min to 4/min to thereby reduce the time spent by the nozzles 114 over the locations 504 in the aimed ground 116 thereby ensuring that the correct amount of water is sprayed despite the change in duty cycle of these nozzles 114. The duty cycles of the other nozzles 114 are scaled up by the processors 200 at step 424 as appropriate in view of the new pivot drive speed of 4 m/min.

Conventional center-pivot irrigation systems move with a constant speed and are unable to do faster irrigation cycles on hot days. With the ability to adjust pivot drive speed by the pivot controller 126 as described herein, the pivot structure 102 speed is controlled automatically by the processors 200 such that the pivot 102 will slow down or speed up to accomplish the desired water application depth across each micro-zone/location 504. In the traditional central pivot control system, the relationship between percentage timer (the percentage speed pivot runs, up to 100%) and water application depth is built-in to be negative exponential. In contrast, in some embodiments, the processors 200 of the controller 126 automatically select the pivot speed based on crop water needs and hence improve the watering efficiency to allow for quicker irrigation cycles. The faster the pivot 102 moves, the less water is put down into the ground. Therefore, if the processors 200 can pre-determine the amount of water the ground needs based on the predictive model 126, look-ahead and look-behind sensors data, the processors 200 can save water by speeding up the pivot 102 to match the required water application.

In some embodiments, the processors 200 first correlate the percentage time with the water application depth on a given pivot 102. Once the pivot 102 turns on, the processors 200 find the highest percentage prescription from nozzles 114 using the predictive model 236. Then, using a relay, the percentage value found and the correlation, the new speed is calculated and set for the pivot 102. It is worth mentioning that it is possible for the percentage prescription calculated to be over 100% because the formula used is:

$$\text{Water depth calculated from the model/Water depth for current speed}$$

Therefore, the slower the pivot speed, the higher the denominator (in the formula), the calculated percentage value will be less than 100% eventually and the calculated new speed will be faster than current. (the smaller the percentage w.r.t. 100%, the faster the speed). On the other hand, the higher the pivot speed, the lower the denominator, thus the calculated percentage will be greater than 100% eventually and the new speed will be slower than current (the greater the percentage w.r.t. 100%, the slower the speed).

To provide a specific example, assume that the current speed and water depth are 22% and 0.74 inch, respectively, and the highest nozzle 114 percentage is 66%. Then, the water depth for next micro-zone 504 would be 0.49 inch (0.74*66%), which corresponds to 33% percentage on time duty cycle.

Based on field data 234, the water saving is around 30% (nozzle 114 is turned on 70% of the time). Moreover, the time saved is 15% on average. Therefore, the total water saving would be 85% time with 30% water saving plus 15% water saving.

In general, the processors 200 of the pivot controller 126 ensure that pivot speed is always in a reasonable range. Having the variable speed helps the pivot 102 to form the water uniformity in the field 500 and complete water cycles faster with less water and time.

Figure 7A:
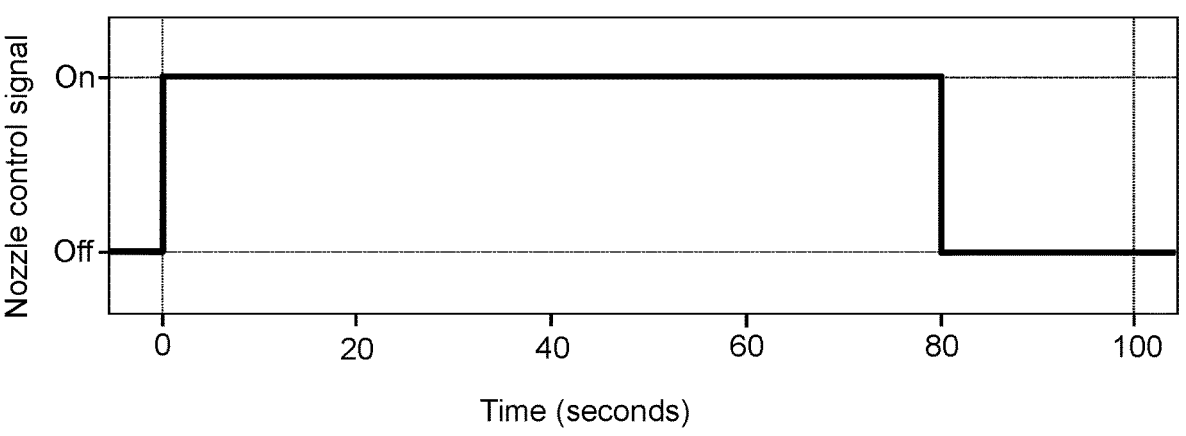
FIG. 7A shows a non-customized 80% nozzle duty cycle control signal that may be determined for one or more nozzles at step 424 of FIG. 4.
Figure 7B:
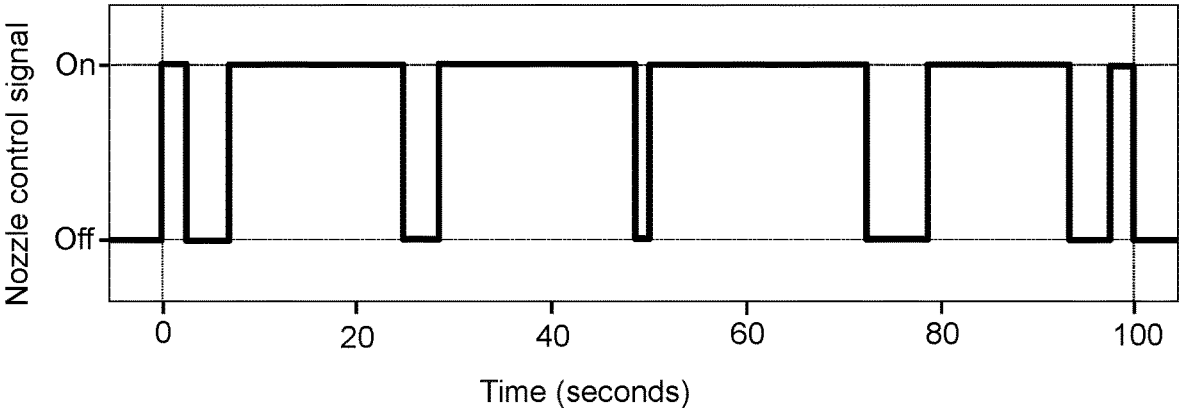
FIG. 7B shows a first example of how the non-normalized nozzle control signal of FIG. 7A may be customized at step 430 of FIG. 4 to become a first customized 80% nozzle duty cycle.

FIGS. 7A, 7B, and 7B shows three different examples of a nozzle control signal for driving a particular nozzle 114 to have a duty cycle of 80%. In particular, FIG. 7A shows a non-customized 80% nozzle duty cycle, FIG. 7B shows how the processors 200 may at step 430 of FIG. 4 customize the non-normalized nozzle control signal of FIG. 7A to become a first customized 80% nozzle duty cycle, and FIG. 7C shows how the processors 200 may at step 430 of FIG. 4 customize the non-normalized nozzle control signal of FIG. 7A to become a second, different customized 80% nozzle duty cycle.

Figure 7C:
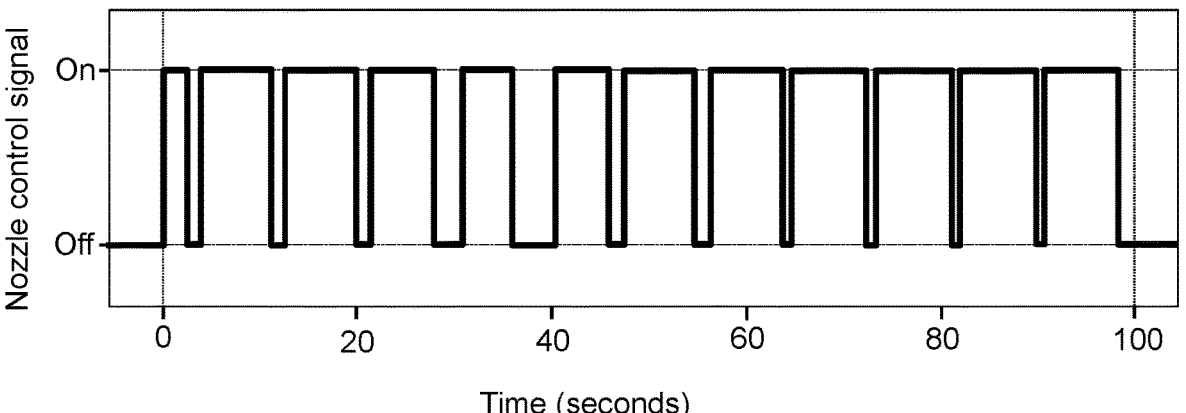
FIG. 7C shows a second example of how the non-normalized nozzle control signal of FIG. 7A may be customized at step 430 of FIG. 4 to become a second customized 80% nozzle duty cycle, which is different than that shown in FIG. 7B.

The three duty nozzle control signals of FIGS. 7A, 7B, and 7C all have an average 80% duty cycle over the same period of time, which is selected to be one hundred seconds in this embodiment to make the duty cycle percentages more easily visible for purposes of description. In other embodiments, the unit of time over which the average duty cycle is maintained may be changed to be other time periods.

A standard water prescription in a conventional variable rate irrigation (VRI) system can cause all nozzles 114 on the pivot 102 to turn OFF at the same time, which results in a sudden surge in water pressure in the pivot pipe 108, a phenomenon referred to herein as "water hammer", which then damages the control valves, the pump 120 and the pivot. For instance, assume that multiple nozzles 114 had a watering prescription corresponding to 80% duty cycle and all such nozzles 114 were controlled using the same nozzle control signal of FIG. 7A. This would cause all these nozzles to be shut off at the same time (i.e., shut off for the last twenty seconds out of the illustrated hundred second time period). Likewise, if other nozzle duty cycles such as 50%, 60%, 70% etc. are generated in the same manner as FIG. 7, this would result in all nozzle duty cycles between 0% and 100% being turned off at the end of the hundred second time period.

To avoid synchronization of the OFF signals for the various nozzles, the processors 200 customize the nozzle control signal at step 430 for each nozzle 114. In some embodiments, the customization is done by a randomization algorithm that prevents the nozzles 114 from all being turned on and off at the same times, thereby solving the water hammer issue and improving water uniformity across the pivot structure 102. In some embodiments, the way this algorithm works is that after the nozzle duty cycles are calculated at step 424, the values are passed by the processors 200 at step 404 to a function that generates randomized prescriptions that maintain the same average duty cycle as was originally calculated. For example, if the processors 200 calculate 80% duty cycle for a nozzle 114, then within hundred seconds, the nozzle 114 is randomly turned on for eighty seconds and the function allocates these eighty seconds randomly within the hundred second time period. In this way, two nozzles 114 with the same 80% duty cycle watering prescription would have different nozzle control signals, such as shown in FIGS. 7B and 7C for example. The randomization prevents the nozzles 114 from being turned on and off at the same times and thus improves water pressure uniformity.

Randomization is only one method of performing the customization at step 430. In other embodiments, the on/off transitions of the nozzle duty cycles may be distributed over time by the processors in a non-random manner. Regardless of method, the general idea is to customize the nozzle control duty cycles so that nozzles 114 are provided nozzle-specific control signals even when the average duty cycles are the same to thereby avoid large numbers of the nozzles being turned off at the same time.

In some embodiments, the processors 200 of the controller 126 do the customization of nozzle control signals centrally as previously described in step 404 of FIG. 4. In other embodiments, this function is build into the nozzle actuators 122 where the processors 200 of the pivot controller 126 send the desired nozzle duty cycle value to a nozzle actuator 122, and then the nozzle actuator 122 generates a random control signal for the nozzle(s) 114 coupled to that actuator 122 while maintaining the average duty cycle over a particular time unit. For example, if the processors send 80% as the duty cycle to the nozzle actuator 122, then within a hundred seconds, the nozzle 114 is turned on for eighty seconds and the function will allocate the eighty seconds randomly within the minute, such as shown in FIGS. 7B and 7C for example. In yet other embodiments, each tower 110 may have a controller or other embedded device such as span-based nozzle actuators. In such embodiments, these processors 200 send the duty cycle values for specific nozzles 114 to the tower electronics, which then customize the various nozzle duty cycle control signals in a similar manner.

Figure 8:
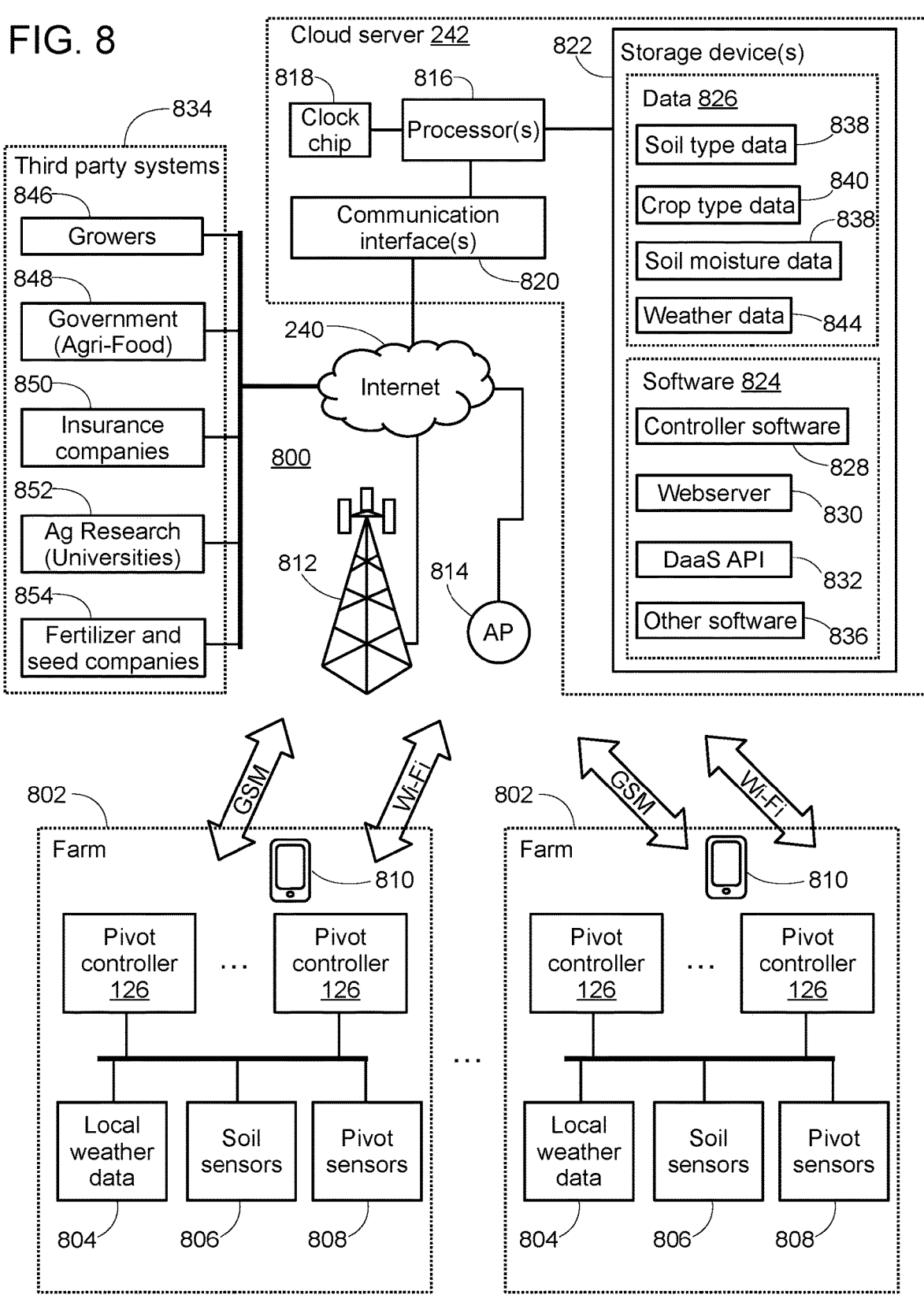
FIG. 8 illustrates a block diagram of a cloud-based automated irrigation system system having a plurality of the automated irrigation systems of FIG. 1 coupled to a cloud-server on the Internet according to an exemplary embodiment.

FIG. 8 illustrates a block diagram of a cloud-based automated irrigation system 800 having a plurality of the above-described automated irrigation systems 100 coupled to a cloud-server 242 on the Internet 240 according to an exemplary embodiment. The cloud-based system 800 includes a plurality of pivot controllers 126, each located at one of a plurality of farms 802. The pivot controllers 126 are coupled to local devices at the farms such as local weather data 804, soil sensors 806 and pivot sensors 808 such that the look-ahead sensors and look-behind sensors 130 and position sensors 136. Farmers or other users can interact with the system 800 and their farm's 802 devices utilizing a mobile device 810 such as mobile phone, computer, or laptop, etc. The communication interfaces 204 of the pivot controllers 126 as well as the mobile devices 810 include GSM and Wi-Fi transceivers for communicating using these protocols with nearby cell phone towers 812 and/or access points (APs) 814. In this way, the various pivot controllers 126 and mobile devices 810 can communicate with the cloud server 242 on the Internet 240.

The cloud server 242 includes one or more processors 816 coupled to a clock chip 818, one or more communication interfaces 820 and one or more storage devices 822. The storage devices 822 include software 824 and data 816 for usage by the processors 816.

Examples of software 824 that may be stored in the storage devices 822 and executed by the processors 816 of the cloud server 242 include top-level controller software 828, a webserver 830 for allowing the farmer mobile devices 810 to access web-based information and control functions for their respective pivot controllers 126 and accounts, and DaaS API 832 for a plurality of external third-party systems 834 to access data 826 stored at the cloud server 126. Other software 836 may be stored therein as required in other embodiments.

Examples of data 826 that may be stored in the storage device(s) 822 of the cloud server 242 include soil type data 838, crop type data 840 and moisture data 842 for the locations in the various fields of the farms 802 where pivot controllers 126 are installed. Weather data 844 for the various farms 802 may also be stored and any other data may be stored as required in other embodiments.

The third-party systems 834 in this example include growers 846, governments 848, insurance companies 850, agricultural research/universities 852, fertilizer and seed companies 854, etc. In some embodiments, any authorized third-party system 834 may access the functionality and data 824 of the cloud server 242 via the Internet 240.

To make it easy for the farmer or other user to control key features of the pivot 102 remotely at any time, a customer software application (app) is provided for installation and execution on the mobile device 810 to allow the farmer to control the plant root zone depth, target soil moisture and speed control. The app connects to cloud-server 242 over the Internet 240 in order to gain access to the data 826 stored in the one or more storage devices 822, which also gives the farmer specific control to his/her pivot controller 126. In some embodiments instead of or in addition to an app, access may also be provided using a web browser and accessing a website provided by the webserver 830 running on the cloud server 242.

In both cases, for security, the user may be required to provide a username and corresponding password. If the provided username/password pair is indeed stored in the online database, then the page will be redirected to the control page where the user will have access to a plurality of options such as setting target moisture characteristics for different locations, i.e., micro-zones 504 of their fields 500. For instance, input text boxes may be provided for the farmer or other user to set crop depth (cm), desired target soil moisture percentage (%), and to turn on/off the pivot 102. After completing the forms and submitting the inputs, the user inputs are sent to the cloud controller 242 for storage in the soil moisture data 838. Furthermore, the cloud server 242 then sends the changes in these values to the appropriate pivot controller(s) 126 to which the changes apply, and the pivot controller(s) 126 may also periodically check the variables, and, when changes are made, pull the online values and feed them to the local predictive model 236.

Although the invention has been described in connection with preferred embodiments, it should be understood that various modifications, additions and alterations may be made to the invention by one skilled in the art without departing from the spirit and scope of the invention.

Although the above description has focused on a center-pivot structure 102 that moves in the forward direction D to thereby rotate around a center point 104, the above systems 100, 800 may also be utilized with other types of irrigation systems that are not center pivot. In other embodiments, the pivot structure 102 may be swapped for any moveable structure that includes nozzles 114 for irrigation. For example, a lateral move irrigation structure may move laterally back and forth instead of around a center point 104. With a lateral irrigation structure, when it is moving in a first direction, that would be deemed the forward direction and the look-ahead sensors 130 would sense the ground ahead and the look-behind sensors 130 would sense the ground behind the structure. Then, when the structure reverses its direction of movement, the forward direction would now also be reversed and the look-ahead/look-behind directions would reverse accordingly. Other movable structures include swing arm corner irrigation systems, wheel move systems, etc.

The look-behind set of sensor data can also be utilized for other purposes such as to detected broken nozzles 114. For example, both stuck on and stuck off nozzles 114 can be automatically detected by the one or more processors 200 examining the look-behind set of sensor data at step 440. Using the look-behind sensor data, system diagnostics can be performed such as identifying nozzle 114 issues (leaks, clogged heads, nozzle actuator failure) and pump 120 issues can be determined as well. For instance, in some cases, a nozzle may get tangled in crops and pulled off the pivot. In such a situation, a large amount of water may be freely flowing out of the line 124 to which the nozzle 114 was previously attached. The controller 126 can detected the pooled water on the ground using the look-behind sensor data. In the event the controller 126 detects a nozzle malfunction or other diagnostic event, an alert such as email, short message service (SMS), push notification, etc. may be sent to the mobile device 810 of the farmer associated with the field 500 at which the problem or event was detected.

Although the above-described FIGS. 3 and 8 show examples of embodiments where the pivot controller 126 is coupled to the Internet 240 for providing data communications with a cloud server 242, this connection from the pivot controller 126 to the Internet 240 may be intermittent and not required to be present at all times. Further, in some embodiments, the connection to the Internet 240 and associated communication interfaces 204 for supporting Internet connectivity may be omitted from the controller 126. Beneficially the controller 126 and system 100 described herein can work completely offline and the controller 126 does not require online access to download watering prescriptions from the cloud server 242. For instance, the watering prescriptions are generated by the controller 126 locally and the various data processing and transmission are done offline. The offline ability is particularly beneficial as Internet 120 coverage in rural areas is limited.

Although detailed field maps 234 that are required to be developed in advance in the conventional variable rate irrigation systems are not required with the systems 100, 800 disclosed here, they may be still be used in conjunction with the teachings herein to further improve watering performance. Likewise, the systems 100, 800 disclosed herein may be used in some embodiments to build up a field map 234 over time as the pivot structure 102 runs according to the look-ahead and look-behind sensor data. Objects such as rocks, streams, ponds, etc. as well as other field aspects such as topography, soil types, environmental conditions, system diagnostics, etc. may be detected or inferred from the sensor data and a field map 234 may be created automatically by the system 100. The systems 100, 800 disclosed here are thus fully compatible with the field-map-based watering improvements available in the related art and may be used in conjunction therewith.

Although the above description has focused on binary on/off control signals for nozzles 114 and wheel motors 138, of course, other types of control signals such as digital messages with water prescription values and/or speed values may be employed in a similar manner.

Although the above-description has focused on irrigation at agricultural facilities, the present invention is equally applicable to any irrigation application including but not limited to agricultural, business and residential properties, etc.

Although a relational database may utilized to store the data 218, 826 of the pivot controller 126 and cloud server 242 in some embodiments, the term "database" as utilized in this description is meant to refer to any stored collection of organized data. The data 218, 826 may be stored in any desired organizational manner.

Although the above description has focused on spraying pure water to irrigate crops and ground, in other embodiments, different ingredients may be combined with the water including fertilizer and/or pesticides. The term "water" in this description is intended to include both pure water and also water including other added or present components.

In an advantageous embodiment, an automated irrigation system 100, 800 includes a movable structure 102 that has nozzles 114 for spraying water on aimed area of ground 116. A controller 126 selects a nozzle 114 and determines a location 504 in an unwatered area 132 to be sprayed after the movable structure 104 has moved forward. A predictive model 236 that takes into account look-ahead sensor data for the location 504 before watering and prior look-behind sensor data from a last time the location 504 was watered is used to generate a watering prescription for the nozzle 114. After watering, the controller 126 determines an error in detected moisture of the location 504 according to updated look-behind sensor data and updates the predictive model 236 if the error exceeds a threshold. When generating watering prescriptions for multiple nozzles 114, the controller 126 normalizes their duty cycles by adjusting the speed of the movable structure 102 and further customizes their nozzle control signals to ensure the nozzles 114 do not turn off at same time.

The above-described functionality may be implemented by software executed by one or more processors operating pursuant to instructions stored on a tangible computer-readable medium such as a storage device to perform the above-described functions of any or all aspects of the pivot controller 126 and/or cloud server 242. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet 240. The processors may be included in a general-purpose or specific-purpose computer that becomes the pivot controller 126, cloud server 242, mobile device 810 or any of the above-described devices as a result of executing the instructions.

In other embodiments, rather than being software modules executed by one or more processors, the above-described functionality may be implemented as hardware modules configured to perform the above-described functions. Examples of hardware modules include combinations of logic gates, integrated circuits, field programmable gate arrays, and application specific integrated circuits, and other analog and digital circuit designs.

Functions of single modules may be separated into multiple units, or the functions of multiple modules may be combined into a single unit. Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. An automated irrigation system comprising:

a movable structure that is movable at least in a forward direction and has a plurality of nozzles for spraying a plurality of water to irrigate an aimed area of ground adjacent a current position of the movable structure;

one or more nozzle actuators, wherein each of the nozzle actuators is coupled to one or more of the nozzles and controls an amount of water per unit time that is sprayed by the one or more of the nozzles to which the nozzle actuator is coupled according to one or more nozzle control signals;

one or more sensors mounted to the movable structure, wherein the one or more sensors firstly detect one or more aspects in an unwatered area of ground toward which the movable structure is moving that is in front of the aimed area of ground, and secondly detect the one or more aspects in a watered area of ground that is behind the aimed area of ground; and a controller coupled to the one or more nozzle actuators and the one or more sensors; wherein, the controller includes one or more processors and one or more storage devices, and, by executing a plurality of software instructions loaded from the one or more storage devices, the one or more processors of the controller are configured to:

select a nozzle and determine a location in the unwatered area of ground that will be sprayed with water by the nozzle after the movable structure has moved in the forward direction;

determine a target moisture characteristic of the location according to a target moisture data stored in the one or more storage devices;

receive a look-ahead set of sensor data for the location from the one or more sensors;

utilize a predictive model that at least takes into account the look-ahead set of sensor data and a prior look-behind set of sensor data from a last time the location was watered to generate a watering prescription for the nozzle;

generate the one or more nozzle control signals such that the nozzle sprays water onto the location according to the watering prescription after the movable structure has moved in the forward direction and the unwatered area of ground has become the aimed area of ground;

after the movable structure has further moved in the forward direction and the aimed area of ground has become the watered area of ground, receive an updated look-behind set of sensor data for the location from the one or more sensors; and update the predictive model for use a next time the movable structure returns to water the location, the predictive model being updated at least according to the updated look-behind set of sensor data and the target moisture characteristic for the location.

2. The automated irrigation system of claim 1, wherein:

the one or more sensors include a rotatable sensor that rotates according to a control signal received from the controller;

the rotatable sensor when rotated into a first position is directed to the unwatered area of ground that is in front of the aimed area of ground and thereby acts as a look-ahead sensor; and the rotatable sensor when rotated into a second position is directed to the watered area of ground that is behind the aimed area of ground and thereby acts as a look-behind sensor.

3. The automated irrigation system of claim 1, wherein the one or more sensors include:

one or more look-ahead sensors mounted to the movable structure, wherein each of the look-ahead sensors is directed toward the unwatered area of ground that is in front of the aimed area of ground; and one or more look-behind sensors mounted to the movable structure, wherein each of the look-behind sensors is directed toward the watered area of ground that is behind the aimed area of ground.

4. The automated irrigation system of claim 1, wherein the one or more sensors include a thermal imager and the one or more aspects detected by the one or more sensors include a plurality of apparent surface temperatures as detected by the thermal imager.

5. The automated irrigation system of claim 1, wherein the one or more sensors include an optical camera and the one or more aspects detected by the one or more sensors include a plurality of visible light as detected by the optical camera.

6. The automated irrigation system of claim 1, further comprising:

a drive actuator that controls an amount of distance per unit time that the movable structure moves in the forward direction according to one or more drive control signals;

wherein the one or more processors of the controller are further configured to:

generate the one or more drive control signals to adjust over time the amount of distance per unit time that the movable structure moves;

utilize the predictive model to generate a plurality of watering prescriptions each corresponding to one of a plurality of specific nozzles, wherein each of the specific nozzles will spray water onto one of a plurality of different locations in the unwatered area of ground after the movable structure has moved in the forward direction; and normalize a plurality of duty cycles of the one or more nozzle control signals for controlling the specific nozzles by adjusting the amount of distance per unit time at which the movable structure moves, wherein the one or more processors of the controller adjust the amount of distance per unit time that the movable structure moves such that a nozzle of the specific nozzles that has a highest watering prescription has a duty cycle of one hundred percent.

7. The automated irrigation system of claim 1, wherein the one or more processors of the controller are further configured to:

utilize the predictive model to generate a plurality of watering prescriptions each corresponding to one of a plurality of specific nozzles, wherein each of the specific nozzles will spray water onto one of a plurality of different locations in the unwatered area of ground after the movable structure has moved in the forward direction; and customize a plurality of duty cycles of the one or more nozzle control signals for controlling the specific nozzles such that a first of the specific nozzles and a second of the specific nozzles that have a same watering prescription have different duty cycles that achieve a same average duty cycle over a period of time.

8. The automated irrigation system of claim 7, wherein the one or more processors of the controller are configured to customize the plurality of duty cycles of the first of the specific nozzles and the second of the specific nozzles to have random differences while maintaining the same average duty cycle over the period of time.

9. The automated irrigation system of claim 1, wherein:

the movable structure is a pivot structure having a point of rotation at a first end and one or more spans of pipe that sequentially extend from the first end;

each of the spans of pipe are supported by one or more wheels such that the pivot structure is rotatable in the forward direction around the point of rotation;

each of the one or more spans of pipe have one or more of the nozzles for spraying the plurality of water to irrigate the aimed area of ground; and the water is delivered to the nozzles via the one or more spans of pipe from a water source at the first end.

10. The automated irrigation system of claim 1, wherein the one or more processors of the controller are configured to:

determine an error in detected moisture of the location according to the updated look-behind set of sensor data in comparison with the target moisture characteristic for the location after the movable structure has further moved in the forward direction and the aimed area of ground has become the watered area of ground;

only update the predictive model when the error exceeds a predetermined threshold; and update the predictive model such that the predictive model will generate a different watering prescription for the nozzle if a same look-ahead set of sensor data is again detected for the location the next time the movable structure returns to water the location.

11. The automated irrigation system of claim 1, wherein the one or more processors of the controller are further configured to determine whether there is a malfunction with the nozzle according to the updated look-behind set of sensor data and send one or more alerts in response to determining there is the malfunction with the nozzle.

12. A controller of an automated irrigation system, the automated irrigation system including a movable structure that is movable at least in a forward direction and has a plurality of nozzles for spraying a plurality of water to irrigate an aimed area of ground adjacent a current position of the movable structure, the controller comprising:

one or more communication interfaces;

one or more storage devices; and one or more processors;

wherein the one or more communication interfaces are coupled to one or more nozzle actuators, each of the nozzle actuators being coupled to one or more of the nozzles and controlling an amount of water per unit time that is sprayed by the one or more of the nozzles to which the nozzle actuator is coupled according to one or more nozzle control signals;

the one or more communication interfaces are further coupled to one or more sensors mounted to the movable structure, the one or more sensors firstly detecting one or more aspects in an unwatered area of ground toward which the movable structure is moving that is in front of the aimed area of ground, and secondly detecting the one or more aspects in a watered area of ground that is behind the aimed area of ground; and by executing a plurality of software instructions loaded from the one or more storage devices, the one or more processors are configured to:

select a nozzle and determine a location in the unwatered area of ground that will be sprayed with water by the nozzle after the movable structure has moved in the forward direction;

determine a target moisture characteristic of the location according to a target moisture data stored in the one or more storage devices;

receive a look-ahead set of sensor data for the location from the one or more sensors;

utilize a predictive model that at least takes into account the look-ahead set of sensor data and a prior look-behind set of sensor data from a last time the location was watered to generate a watering prescription for the nozzle;

generate the one or more nozzle control signals such that the nozzle sprays water onto the location according to the watering prescription after the movable structure has moved in the forward direction and the unwatered area of ground has become the aimed area of ground;

after the movable structure has further moved in the forward direction and the aimed area of ground has become the watered area of ground, receive an updated look-behind set of sensor data for the location from the one or more sensors; and update the predictive model for use a next time the movable structure returns to water the location, the predictive model being updated at least according to the updated look-behind set of sensor data and the target moisture characteristic for the location.

13. The controller of claim 12, wherein:

the one or more communication interfaces are further coupled to a drive actuator that controls an amount of distance per unit time that the movable structure moves in the forward direction according to one or more drive control signals; and the one or more processors are further configured to:

generate the one or more drive control signals to adjust over time the amount of distance per unit time that the movable structure moves;

utilize the predictive model to generate a plurality of watering prescriptions each corresponding to one of a plurality of specific nozzles, wherein each of the specific nozzles will spray water onto one of a plurality of different locations in the unwatered area of ground after the movable structure has moved in the forward direction; and normalize a plurality of duty cycles of the one or more nozzle control signals for controlling the specific nozzles by adjusting the amount of distance per unit time at which the movable structure moves, wherein the one or more processors of the controller adjust the amount of distance per unit time that the movable structure moves such that a nozzle of the specific nozzles that has a highest watering prescription has a duty cycle of one hundred percent.

14. The controller of claim 12, wherein the one or more processors are further configured to:

utilize the predictive model to generate a plurality of watering prescriptions each corresponding to one of a plurality of specific nozzles, wherein each of the specific nozzles will spray water onto one of a plurality of different locations in the unwatered area of ground after the movable structure has moved in the forward direction; and customize a plurality of duty cycles of the one or more nozzle control signals for controlling the specific nozzles such that a first of the specific nozzles and a second of the specific nozzles that have a same watering prescription have different duty cycles that achieve a same average duty cycle over a period of time.

15. The controller of claim 14, wherein the one or more processors are configured to customize the plurality of duty cycles of the first of the specific nozzles and the second of the specific nozzles to have random differences while maintaining the same average duty cycle over the period of time.

16. The controller of claim 12, wherein the one or more processors are configured to:

determine an error in detected moisture of the location according to the updated look-behind set of sensor data in comparison with the target moisture characteristic for the location after the movable structure has further moved in the forward direction and the aimed area of ground has become the watered area of ground;

only update the predictive model when the error exceeds a predetermined threshold; and update the predictive model such that the predictive model will generate a different watering prescription for the nozzle if a same look-ahead set of sensor data is again detected for the location the next time the movable structure returns to water the location.

17. The controller of claim 12, wherein the one or more processors are further configured to determine whether there is a malfunction with the nozzle according to the updated look-behind set of sensor data and send one or more alerts in response to determining there is the malfunction with the nozzle.

18. A method of controlling an automated irrigation system, the automated irrigation system including a movable structure that is movable at least in a forward direction and has a plurality of nozzles for spraying a plurality of water to irrigate an aimed area of ground adjacent a current position of the movable structure, the method comprising:

communicating by one or more processors with one or more nozzle actuators, each of the nozzle actuators being coupled to one or more of the nozzles and controlling an amount of water per unit time that is sprayed by the one or more of the nozzles to which the nozzle actuator is coupled according to one or more nozzle control signals;

communicating by the one or more processors with one or more sensors mounted to the movable structure, the one or more sensors firstly detecting one or more aspects in an unwatered area of ground toward which the movable structure is moving that is in front of the aimed area of ground, and secondly detecting the one or more aspects in a watered area of ground that is behind the aimed area of ground;

selecting by the one or more processors a nozzle and determine a location in the unwatered area of ground that will be sprayed with water by the nozzle after the movable structure has moved in the forward direction;

determining by the one or more processors a target moisture characteristic of the location according to a target moisture data stored in the one or more storage devices;

receiving by the one or more processors a look-ahead set of sensor data for the location from the one or more sensors;

utilizing by the one or more processors a predictive model that at least takes into account the look-ahead set of sensor data and a prior look-behind set of sensor data from a last time the location was watered to generate a watering prescription for the nozzle;

generating by the one or more processors the one or more nozzle control signals such that the nozzle sprays water onto the location according to the watering prescription after the movable structure has moved in the forward direction and the unwatered area of ground has become the aimed area of ground;

after the movable structure has further moved in the forward direction and the aimed area of ground has become the watered area of ground, receiving by the one or more processors an updated look-behind set of sensor data for the location from the one or more sensors; and updating by the one or more processors the predictive model for use a next time the movable structure returns to water the location, the predictive model being updated at least according to the updated look-behind set of sensor data and the target moisture characteristic for the location.

19. The method of claim 18, further comprising:

communicating by the one or more processors with a drive actuator that controls an amount of distance per unit time that the movable structure moves in the forward direction according to one or more drive control signals;

generating by the one or more processors the one or more drive control signals to adjust over time the amount of distance per unit time that the movable structure moves;

utilizing by the one or more processors the predictive model to generate a plurality of watering prescriptions each corresponding to one of a plurality of specific nozzles, wherein each of the specific nozzles will spray water onto one of a plurality of different locations in the unwatered area of ground after the movable structure has moved in the forward direction; and normalizing by the one or more processors a plurality of duty cycles of the one or more nozzle control signals for controlling the specific nozzles by adjusting the amount of distance per unit time at which the movable structure moves, wherein the one or more processors of the one or more processors adjust the amount of distance per unit time that the movable structure moves such that a nozzle of the specific nozzles that has a highest watering prescription has a duty cycle of one hundred percent.

20. The method of claim 18, further comprising:

utilizing by the one or more processors the predictive model to generate a plurality of watering prescriptions each corresponding to one of a plurality of specific nozzles, wherein each of the specific nozzles will spray water onto one of a plurality of different locations in the unwatered area of ground after the movable structure has moved in the forward direction; and customizing by the one or more processors a plurality of duty cycles of the one or more nozzle control signals for controlling the specific nozzles such that a first of the specific nozzles and a second of the specific nozzles that have a same watering prescription have different duty cycles that achieve a same average duty cycle over a period of time.

* * * * *